US012770164B2

(12) United States Patent
Chen et al.

(10) Patent No.: US 12,770,164 B2
(45) Date of Patent: Oct. 20, 2026

(54) PERFORMANCE ANOMALY DETECTION AND SMART ALERTING

(71) Applicant: eBay Inc., San Jose, CA (US)

(72) Inventors: Laura Chen, Shanghai (CN); Zichao Liu, Shanghai (CN); Qingbo Yang, Shanghai (CN); Zhenggang Yuan, Shanghai (CN); Sleven Liu, Shanghai (CN)

(73) Assignee: eBay Inc., San Jose, CA (US)

( * ) Notice: Subject to any disclaimer, the term of this patent is extended or adjusted under 35 U.S.C. 154(b) by 4 days.

(21) Appl. No.: 18/492,440

(22) Filed: Oct. 23, 2023

(65) Prior Publication Data

US 2025/0131468 A1 Apr. 24, 2025

(51) Int. Cl.
*G06Q 30/0242* (2023.01)
*G08B 21/18* (2006.01)

(52) U.S. Cl.
CPC ....... *G06Q 30/0242* (2013.01); *G08B 21/182* (2013.01)

(58) Field of Classification Search
CPC .......................... G06Q 30/0242; G08B 21/182
USPC ........................................ 705/14.41; 709/224
See application file for complete search history.

(56) References Cited

U.S. PATENT DOCUMENTS

| | | | | |
|---|---|---|---|---|
| 10,497,034 | B2 | 12/2019 | Yang et al. | |
| 10,853,161 | B2 | 12/2020 | Ahad | |
| 10,901,880 | B1 | 1/2021 | Bernard et al. | |
| 2005/0209919 | A1* | 9/2005 | Stubbs | G06Q 30/02 705/14.69 |
| 2005/0256759 | A1* | 11/2005 | Acharya | G06Q 30/02 705/7.31 |
| 2007/0073579 | A1 | 3/2007 | Immorlica et al. | |
| 2008/0114624 | A1 | 5/2008 | Kitts | |

(Continued)

FOREIGN PATENT DOCUMENTS

| | | | | |
|---|---|---|---|---|
| CN | 107168854 | A | | 9/2017 |
| CN | 109800025 | A | * | 5/2019 |

(Continued)

OTHER PUBLICATIONS

Simo, Server-side Tagging In Google Tag Manager, 2020 (Year: 2020).*

(Continued)

*Primary Examiner* — Tarek Elchanti
(74) *Attorney, Agent, or Firm* — Shook Hardy & Bacon L.L.P.

(57) ABSTRACT

The technology disclosed herein relates to utilizing a performance anomaly detection model to identify performance metrics (e.g., cost-per-click data) that are above an anomaly threshold. For example, communication sessions can be established with one or more servers hosted by one or more third-parties for receiving performance metrics for a first entity. The performance metrics received for the first entity can be used by the performance anomaly detection model, which can be trained using historical performance metrics (e.g., of the first entity, of the first entity during particular time periods, of the first entity for particular geographical locations), for anomaly detection. Based on one or more anomaly detections, one or more notifications or particular displays can be provided to a user device.

16 Claims, 16 Drawing Sheets

(56) References Cited

U.S. PATENT DOCUMENTS

| | | | | |
|---|---|---|---|---|
| 2014/0108640 | A1* | 4/2014 | Mathis | H04L 41/145 709/224 |
| 2016/0062950 | A1* | 3/2016 | Brodersen | G06F 18/2433 702/181 |
| 2016/0065604 | A1* | 3/2016 | Chen | G06F 21/6227 726/23 |
| 2016/0262705 | A1* | 9/2016 | Swamy | A61B 5/7278 |
| 2019/0057009 | A1 | 2/2019 | Wang et al. | |
| 2019/0122258 | A1 | 4/2019 | Bramberger et al. | |
| 2021/0232291 | A1* | 7/2021 | Abdulaal | H04L 43/045 |
| 2021/0287258 | A1* | 9/2021 | Choi | G06Q 30/0276 |

FOREIGN PATENT DOCUMENTS

| | | | | |
|---|---|---|---|---|
| CN | 115982224 | A | | 4/2023 |
| KR | 20240149554 | A | * | 10/2024 |
| WO | 2023/059396 | A1 | | 4/2023 |

OTHER PUBLICATIONS

Gohil, N., et al., "A Survey on Online Advertising and Click fraud detection", 2nd National Conference On Research Trends in Information and Communication Technology, Aug. 2020. pp. 1-6.
Wiatr et al., "Click-Fraud Detection for Online Advertising", Dln book: Parallel Processing and Applied Mathematics, 13th International Conference, PPAM 2019, pp. 261-271.
Zhang, Z., et al., "Moving Metric Detection and Alerting System at eBay", eBay Inc, 2020. pp. 1-5.
Extended European Search Report received for European Application No. 24207687.5, mailed on Jan. 27, 2025, 9 pages.

* cited by examiner

500

Request URL http://mmd-ng-pp-svc.mmd-prod-ns.svc.25.tess.io:8848/insight/query

Request Payload

```
{
  "filter":{
    "insightType":"mmd_alert",
    "watchableId":"a25b47c7-9e0f-451d-b8b2-9b42dafabd06",
    "isAnomaly":true,
    "checkpoint":{
      "$lt":"2022-07-24 23:00:00",
      "$gte":"2022-06-01 22:00:00"
    },
    "finalScore":{
      "$gte":31
    }
  },
  "project":{
    "timeSeries":0
  } ,
  "cursor":"",
  "sort":{
    "finalScore":-1,
    "insightType":-1,
    "checkpoint":-1,
    "watchableId":-1
  },
  "limit":100,
  "skip":0
}
```

Response

```
"data":[
  {
    "checkpoint":"2022-06-06 23:00:00",
    "watchableId":"a25b47c7-9e0f-451d-b8b2-9b42dafabd06",
    "_"
  },
  "_"
]"0":{
  "checkpoint":"2022-06-06 23:00:00",
  "watchableId":"a25b47c7-9e0f-451d-b8b2-9b42dafabd06",
  "_"
}"anomalyScore":"0.999506383
checkpoint":"2022-06-06 23:00:00""createdAt":"2022-07-22T12:17:45.462""cut":{

}"detail":[
  {
    "t":1654470000,
    "v":0.10994350714730658,
    "isDataFilled":false,
    "seasonality":0.007086169284910152,
    "_"
  },
  "_"
]"detectOptions":"{\"th_anomaly_score": 0.95, \"seasonal_period\": 24,
\"Linear_win\": 24, \"trend_win\": 24, \"rsd_win\": 24, \"check_win\": 24,
\"maturity_gap\": 2, \"interval\": 3600}""dimension":"null
domain":"Marketing Tech""finalScore":"9995.068311691284
granularity":"0
hasError":"false
id":"a142bbe4-e1e6-4270-a541-642004b77f13""insightType":"mmd_alert""isAnomaly":"true
metricName":"Cost per click""modelType":"burst_model""queryWatchableId":"32000ade-
7701-4071-8c21-4eddd66509f6""share":"1
sourceId":"dfb0b304-9a75-4035-9a51-d1831b3f3c87""summary":{
  "t":1654574400,
  "v":0.28002955739408947,
  "isDataFilled":false,
  "seasonality":0.003292378250921 7936,
  "_"
}"suppressed":"false
updatedAt":"2022-07-22T12:17:45.462""vsMetric":"_sum_clicks""watchableId":"a25b47c7-
9e0f-451d-b8b2-9b42dafabd06"
```

FIG. 8

1000

MMD Burst Model

Robust Decomposition for Anomaly Detection

Learn "Normal" Patterns Using Time-Series Decomposer

For a given time series $X$ , $$L_t = \frac{1}{w}\sum_{i=-k}^{k} X_{t+i}, \quad k = \frac{w-1}{2}$$

$$L' = X - L \qquad S_t = median(L'_{t-iw} \mid i \le \tau, i \in \mathbb{N})$$

$$S' = X - S \qquad T_t^f = median(S'_{t-j} \mid j \le w, j \in \mathbb{N})$$

$$T = T^f + median(S' - T^f)$$

$$R = X - T - S$$

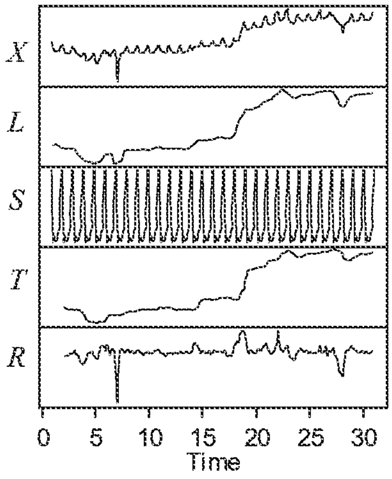

MMD Burst Model

Robust Decomposition for Anomaly Detection

Determine Distribution-Free "Normal" Range of a Metric

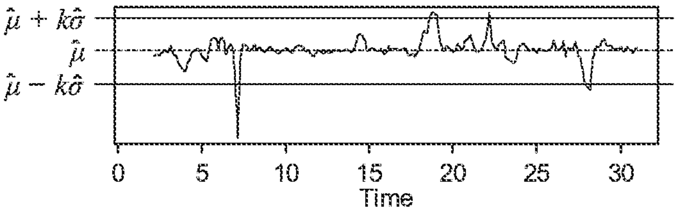

Using median and median absolute deviation (MAD) as robust estimation when containing outliers:

$$\hat{\mu} = median(R)$$

$$\hat{\sigma} = b \times median(|R_t - median(R)|)$$

*FIG. 10*

1100

| | FROM | TO |
|---|---|---|
| **Metrics** | Hourly Cost, Spend Cadence, daily run rate | Hourly CPC (primary) |
| **Input Dependency** | BU, Finance, Hourly partner data (human input) | Hourly partner data (no human input) |
| **Granularity** | Country, Overall campaigns | Country, Overall evergreen campaigns |
| **Number of Alerts June 2022** | Observed **~1600** | Observed **~130** |
| **Number of True Positives June 2022** | 54 | 15 |
| **External system** | N/A | Onboard onto CT's MMD platform |
| **False Positive Rate (FPR)** $\frac{FP}{TN+FP} = \frac{FP}{N}$ | (1600-54) / ((8*2+2)*24*30-54) =1546/12906 **≈11.98%** | (130-15) / (8*24*30-15) **≈ 2%** |
| **Precision or Positive Predictive Value (PPV)** $\frac{TP}{TP+FP}$ (Extreme Case ONLY, exclude daily BU Operations) | 54/1600 **≈ 3.38%** | 15/130 **≈ 11.54%** |
| **Method** | Rule Based defined by BU | MMD's Burst Model based on history data trend |

*FIG. 11*

1200

| | |
|---|---|
| Recall<br>Sensitivity<br>True positive rate (TPR) | $\frac{TP}{FN+TP} = \frac{TP}{P}$ |
| False positive rate (FPR)<br>False alarm rate | $\frac{FP}{TN+FP} = \frac{FP}{N}$ |
| Specificity<br>True negative rate (TNR) | $\frac{TN}{TN+FP} = \frac{TN}{N} = 1 - FPR$ |
| Precision | $\frac{TP}{TP+FP}$ |
| False Positive Rate (FPR) | $\frac{FN}{FN+TP} = \frac{FN}{P}$ |
| Accuracy | $\frac{TP+TN}{P+N} = \frac{TP+TN}{TP+TN+FP+FN}$ |

FIG. 12

PERFORMANCE ANOMALY DETECTION AND SMART ALERTING

BACKGROUND

Websites, applications, and other service-providing platforms can provide recommendations associated with digital marketing to users for a plurality of e-commerce platforms. For example, a website may provide item recommendations or service recommendations for a user to purchase. The recommendations are sometimes provided by different sellers, and the recommendations may also include an image or video for example. With the ever-increasing use of recommendations through various platforms, improvements in computing operations associated with these recommendations can provide more efficient and accurate processing of analytical data. Further, improvements to user functionality and navigation associated with these recommendations is desirable.

SUMMARY

At a high level, aspects described herein relate to performance metric anomaly detection using a performance anomaly detection model. The performance anomaly detection model can detect the anomalies that are above one or more anomaly thresholds based on performance metric historical trends and/or seasonality considerations of the performance metrics (e.g., trends in historical performance metrics during a particular time period, trends in historical performance metrics at particular times during particular days, trends in historical performance metrics for a particular geographical area). For example, the methods, systems, and media described herein can detect issues triggering the anomalies, as well as providing for early detection of these issues. As another example, the technology described herein can provide for alerts, other types of notifications, and automatic remediation for one or more of each of the issues detected.

In some example embodiments, a communication session (e.g., between a user device or server) can be established with a first server hosted by a third-party, with a second server hosted by the third-party, with a third server hosted by another third-party, or one or more combinations thereof. Based on establishment of the one or more communication sessions, performance data (e.g., cost-per-click data) for a first entity can be automatically received from each of the servers. A performance anomaly detection model can be applied to the performance data (e.g., time series that include the performance data) for anomaly detection based on one or more anomaly thresholds. The performance anomaly detection model can be trained using historical cost-per-click data (e.g., historical cost-per-click data of the first entity for a particular geographical area corresponding to particular time periods) and other historical performance data. As one non-limiting example, the performance anomaly detection model can be trained using historical cost-per-click data of the first entity during a particular time period during a particular day of the week for a particular city within a particular country.

Upon an anomaly detection (the anomaly being detected based on utilization of the performance anomaly detection model), one or more alerts, other types of notifications, automatic remediation, or one or more combinations thereof, may be initiated. For example, based on determining that cost-per-click data is above an anomaly threshold, a notification can be provided to a user device. As another example, the anomaly detection can be indicated on a display (e.g., of a user device) within a graph or table being displayed on the user device. In some embodiments, a particular automatic remediation may include pausing a particular action associated with the corresponding server and the first entity.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 8 illustrates example application programming interface (API) requests and responses associated with a performance anomaly detection model, in accordance with an embodiment described herein;

FIG. 10 depicts one example embodiment of a performance anomaly detection model for anomaly detection, in accordance with an embodiment described herein;

FIGS. 11-12 illustrate example performance model metrics for a performance anomaly detection model, in accordance with an embodiment described herein;

DETAILED DESCRIPTION

Figure 1:
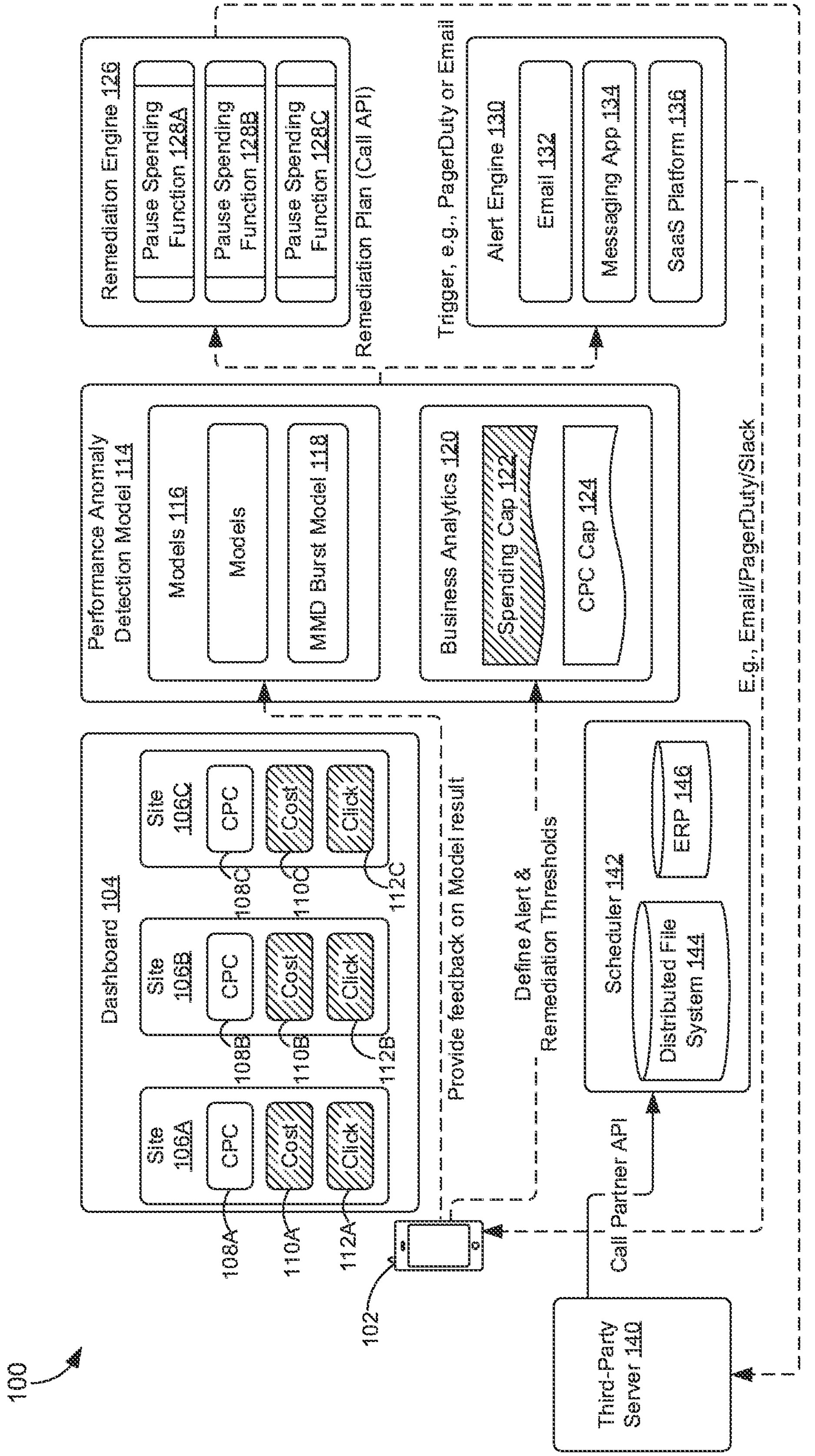
FIG. 1 includes an example operating environment suitable for employing a performance anomaly detection model, in accordance with an embodiment described herein.

Websites, applications, and other service-providing platforms have been widely employed to provide recommendations (e.g., associated with digital marketing) to users of those websites, applications, or other service-providing platforms. For example, a third-party server can provide recommendations associated with digital marketing for a first entity (e.g., an e-commerce provider) that is a separate entity than the third-party, such that the recommendations provided to the users of the third-party server can accept offers for items (e.g., goods, software products) or services offered by the first entity. To further illustrate, a particular application may provide item recommendations or service recommendations provided by the first entity for a user of the application to purchase while using the application that is provided by an entity that is separate from the first entity.

The recommendations associated with digital marketing that are provided by a third-party are sometimes provided by different sellers (e.g., a plurality of entities that are separate from the third-party application). The ever-increasing use of digital recommendations through various platforms allows businesses and other entities to effectively communicate content to users of third-party platforms. For example, the entity providing the item or service via a digital recommendation through a third-party website, application, or other service-providing platform will pay the third-party based on a user clicking on the recommendation. This cost-per-click can be determined by dividing the cost to advertise via the third-party by the number of clicks generated by a digital advertisement for the item or service provided by the first entity.

At times, when a recommendation is provided on a third-party website, application, or other service-providing platform, particular data points associated with these recommendations can spike or otherwise dramatically change for various reasons. For example, sometimes these spikes or dramatic changes are merely software errors of prior methods or systems, improper model detection or insufficient model training of the prior methods or systems, or too much or improper data inputs to these prior models. To illustrate, when a spike or change is detected by these prior systems, these systems fail to determine or detect that these spikes or changes are due to a business operation team making a strategic change, which the prior model or software is unaware of or fails to detect or otherwise take into consideration. As an example, these prior systems and methods have failed to detect or recognize that a bid strategy (e.g., being managed by a machine learning engine or an operations team) has been implemented. Example of these bid strategies may include increasing a particular price for a single item or service, changing a target return on ad spend (ROAS) that increases or reduces a particular cost, changing a conversion value (e.g., a shift of increased values for New York City users from 20% to 22%)). These bid strategy changes that are intended are usually not communicated to or detected by the prior software or model.

In these ways, the prior systems fall short in actual and true anomaly detection. In yet another example, when a data outage or service interruption at a particular server managed by the third-party causes an increase to the pricing for the single item or service, these prior systems (e.g., software or models) have not been able to detect or realize that this data outage or service interruption was the actual cause of the change or spike. Furthermore, in situations where a malicious actor (or machine) has implemented click-fraud to affect the recommendation cost (e.g., advertising budget) of a particular entity, these prior systems have failed to determine that this is the true cause of the anomaly (e.g., spike or dramatic change to particular monitored data).

In these ways, prior methods and systems that monitor digital recommendation costs have had various shortcomings and drawbacks with respect to effective monitoring and remediation based on any identified triggers related to recommendations (e.g., recommendation costs). For example, prior methods and systems have failed to identify particular causes that have triggered increases to digital recommendation costs (e.g., a change to a bidding strategy or data outage). In an instance where a data outage has caused an increase to a digital recommendation, computer network communications between computing devices associated with the first entity may be adversely affected, computer network communications between computing devices associated with the first entity and computing devices associated with the third-party may be adversely affected, and computer network communications between computing devices associated with the first entity and computing devices associated with users utilizing the third-party digital service may be adversely affected.

Furthermore, some prior system architectures that include machine learning models have not trained the machine learning models on particular performance metrics (e.g., historical cost-per-click data for the first entity associated with an item or service of the digital recommendation during a particular time period). Rather, these prior systems and methods have used general rule-based approaches that either generate a plethora of false alarms or fail to detect a severe business impacting issue early enough for proper remedial action. For example, prior systems have merely set bidding adjustments for digital recommendations based on a target sales amount and a target spend amount. Other prior system architectures have merely set bid limits to circumvent overspending. As a result, these prior systems can mischaracterize or fail to identify a cost increase, identify an inaccurate cause for a purported increase, and provide too many false alarms.

As another example, each time an additional bidding adjustment or bid limit is applied, associated contents or payload (e.g., payload associated with metadata from each rule-based limitation applied) is increased due to the additional processing needed to analyze an associated database that includes the limits or adjustments for bidding. In this way, throughput and latency can result from this additional processing and metadata being transmitted over the network. In some instances, this additional processing can also increase storage device I/O (e.g., excess physical read/write head movements on non-volatile disk) when stored bid factors are incorrectly or inaccurately identified or labeled, since unnecessary information is being processed or stored. In doing so, a computing system often has to reach out to the storage device to perform a read or write operation, which is time consuming, error prone, and can eventually wear on components, such as a read/write head.

Accordingly, it is desirable for methods and systems to accurately monitor, detect, and remedy anomalous recommendation costs, such as detection of particular causes that have triggered particular increases to digital recommendation costs (e.g., a change to a bidding strategy or data outage). This is also desirable with respect to enhancing computer network communications between computing devices associated with the first entity, enhancing computer network communications between computing devices associated with the first entity and computing devices associated with the third-party, as well as enhancing computer network communications between computing devices associated with the first entity and computing devices associated with users utilizing the third-party digital service. As such, the technology described herein achieves these goals and provides various improvements to the problems specific to the prior systems discussed above.

For example, in embodiments of the present disclosure, a computer-implemented method begins by establishing a communication session with a server hosted by a third-party. In some embodiments, one or more additional communication sessions may be established with one or more other servers hosted by the third-party. Additionally or alternatively, one or more additional communication sessions may be established with one or more other servers hosted by a different third-party. The server hosted by the third-party may comprise one or more computing devices/user devices, servers, databases, or one or more combinations thereof, configured to generate digital content, such as a website or application, for example, which may be accessed over a network. In some embodiments, an application server associated with a first entity establishes the communication session with the server hosted by the third-party, such that the application server can offer an item or service on a third-party application or third-party website.

Based on establishing the communication session, cost-per-click data for the first entity can be received from the server hosted by the third-party. The cost-per-click data for the first entity relates to the price for the first entity for each time a user interacts with content being offered by the first entity through the third-party digital service (e.g., a webpage or application), such as the user selecting or clicking on the item or service offered by the first entity through the third-party digital service. Additionally or alternatively, other performance metrics corresponding to the first entity can be received from the third-party server, such as, for example, cost-per-action (the price for the first entity for each time a user performs a particular action with respect to the content being offered by the first entity through the third-party digital service, such as purchasing an item or service offered by the first entity, downloading software offered by the first entity, filling out a form offered by the first entity), cost-per-mille (cost per thousand impressions, or the cost of sending a thousand email messages), click-through-rate (ratio of clicks to impressions), view-through-rate (number of ads a user did not skip over compared to the number of impressions (i.e., ads rendered)), another type of performance metric, or one or more combinations thereof.

The performance metrics received from the third-party server can be used to identify one or more anomalies above an anomaly threshold for one or more performance metrics. As one example, a performance anomaly detection model can be applied to the cost-per-click data to generate an output that is compared to the anomaly threshold. The performance anomaly detection model can be trained using historical cost-per-click data. For example, the performance anomaly detection model can be trained using historical cost-per-click data of the first entity that is grouped based on particular days and particular time periods during the particular days (e.g., a first grouping of historical cost-per-click data for a first day (e.g., a Monday one day before a particular holiday) during a first time period (e.g., from 12:00:00 pm EST to 1:00:00 pm EST), a second grouping of historical cost-per-click data for the first day during a second time period (e.g., from 5:00:00 pm EST to 7:00:00 pm EST), and a third grouping of historical cost-per-click data for a second day during the first time period). In some embodiments, the performance anomaly detection model can be trained using historical cost-per-click data of the first entity for a particular geographical area (e.g., a particular city in a particular country, a particular state in a particular country, a particular town in a particular country).

In embodiments, based on applying the performance anomaly detection model to the performance metrics (e.g., cost-per-click data), output from the performance anomaly detection model can be compared to an anomaly threshold. The anomaly threshold can be based on the type of performance metric, particular performance metrics with respect to the first entity, a spending cap associated with the first entity, a location of the server hosted by the third-party, or one or more combinations thereof, and in some embodiments, the anomaly threshold can vary for different geographical locations (e.g., for different cities within the same state, for different countries). Based on determining that the output is above the anomaly threshold, a notification can be provided to a user device. In some embodiments, a detected anomaly can be indicated and displayed on the user device in graphical form or in a table.

Having provided some example scenarios, a technology suitable for performing these examples is described in more detail with reference to the drawings. It will be understood that additional systems and methods for providing the improved search results and navigation can be derived from the following description of the technology.

Turning now to FIG. 1, FIG. 1 illustrates example operating environment 100 in which implementations of the present disclosure may be employed. In particular, FIG. 1 illustrates a high-level architecture of operating environment 100 having components in accordance with implementations of the present disclosure. The components and architecture of FIG. 1 are intended as examples, as noted toward the end of the Detailed Description.

Example operating environment 100 includes user device 102; dashboard 104 communicatively coupled with a plurality of sites 106A-106C (which each include a cost-per-click (CPC) component 108A-108C, a cost component 110A-110C, and a click component 112A-112C); a performance anomaly detection model 114 that has one or more models 116, a Moving Metric Detector Burst model 118, and a plurality of business analytics 120 including a spending cap 122 and a cost-per-click cap 124; remediation engine 126 including a pause spending function 128A for the site 106A, a pause spending function 128B for the site 106B, and a pause spending function 128C for the site 106C; an alert engine 130 for alerting user device 102 via an email 132, a messaging application 134, or a Software-as-a-Service (SaaS) platform 136; a third-party server 140; and a scheduler 142 including a distributed file system 144 and an Enterprise Resource Planning (ERP) System 146.

The user device 102 may be a device that has the capability of using a wireless communications network, and may also be referred to as a "computing device," "mobile device," "user equipment," "wireless communication device," or "UE." A user device, in some embodiments, may take on a variety of forms, such as a PC, a laptop computer, a tablet, a mobile phone, a PDA, a server, or any other device that is capable of communicating with other devices (e.g., by transmitting or receiving a signal) using a wireless communication. Broadly, the user device 102 can include computer-readable media storing computer-executable instructions executed by at least one computer processor. One example of a user device includes computing device 1600 described herein with reference to FIG. 16.

As illustrated in example environment 100, the user device 102 may be capable of displaying the dashboard 104 and may be configured to communicate with the performance anomaly detection model 114 and other components of example operating environment 100 (e.g., alert engine 130). Other embodiments of example environment 100 may include additional user devices capable of displaying a dashboard (e.g., dashboard 104) and configured to communicate (e.g., by transmitting or receiving a signal) with the performance anomaly detection model 114, the remediation engine 126, the alert engine 130, the third-party server 140, and the scheduler 142. The user device 102 may be operated by a user, such as one or more of a person, machine, robot, other user device operator, or one or more combinations thereof. The user of the user device 102 may be associated with a first entity (e.g., an entity that is a different entity associated with the third-party server 140).

The dashboard 104 may include performance metrics (e.g., corresponding to the CPC components 108A-108C, the cost components 110A-110C, and the click components 112A-112C) for each of a plurality of sites 106A-106C. In embodiments, one or more of the sites 106A-106C displayed on the dashboard 104 (e.g., to a user of user device 102 associated with the first entity) can provide e-commerce offers to the third-party server 140 for advertising on webpages, websites, or applications of the third-party. For example, the third-party server 140 hosted by the third-party may comprise one or more computing devices/user devices, servers, databases, or one or more combinations thereof, configured to generate digital content, such as a website or application, for example, which may be accessed over a network (e.g., via an application server associated with the first entity) based on established communication sessions, such that the application server associated with the first entity can offer an item or service on a third-party application or third-party website via the third-party server 140. In some embodiments, site 106B may correspond to a core server (e.g., a central monitoring system) associated with e-commerce offers by the first entity, and the site 106C may correspond to a vertical site for e-commerce offers and may include hardware components for additional processing systems (e.g., for scaling up capabilities associated with the first entity for other locations).

In a non-limiting example, the first site 106A may correspond to e-commerce offers provided by the first entity via a third-party webpage (e.g., including a search engine) associated with a first city in a first state of the United States, the second site 106B may correspond to e-commerce offers provided by the first entity via the third-party webpage associated with a second city in the first state of the United States, and the third site 106C may correspond to the third-party webpage associated with a third city in the European Union. In another example embodiment, the first site 106A may correspond to a third-party application (e.g., a social media application) associated with a first city in a first state of the United States (e.g., wherein the CPC component 108A, the cost component 110A, and the click component 112A include cost-per-click data, cost data, and click data for a plurality of items or services advertised on the third-party application for users located within the first city), the second site 106B may correspond to the third-party application associated with the first state of the United States (e.g., wherein the CPC component 108B, the cost component 110B, and the click component 112B include cost-per-click data, cost data, and click data for a plurality of items or services advertised on the third-party application for users located within the entirety of the first state), and the third site 106C may correspond to the third-party application associated with a second city in the United States. In yet another example embodiment, the first site 106A may include cost-per-click data, cost data, and click data for a plurality of items or services advertised on a third-party digital service provider for a particular geographical area, the second site 106B may include cost-per-click data, cost data, and click data for the plurality of items or services advertised on the third-party digital service provider for a plurality of particular geographical areas including the particular geographical area, and the third site 106C may include cost-per-click data, cost data, and click data for the plurality of items or services advertised on a different third-party digital service provider for the particular geographical area.

In some embodiments, the cost-per-click data, cost data, and click data for one or more items or services advertised on one or more third-party digital service providers for one or more particular geographical areas may be grouped based on a time period. For example, in some embodiments, the cost-per-click data, cost data, and click data may be tracked hourly for a plurality of days to generate historical cost-per-click data. In some embodiments, the cost-per-click data may additionally or alternatively be tracked and grouped based on a particular season (e.g., a holiday season, a winter season). In some embodiments, the cost-per-click data may include time stamps for constructing time series of the cost-per-click data (e.g., constructed based on a time of day, a season, a particular geographical location).

In some embodiments, the dashboard 104 may include other performance metrics for each of the sites 106A-106C, such as cost-per-action (the price for the first entity for each time a user performs a particular action with respect to the content being offered by the first entity through the third-party digital service, such as purchasing an item or service offered by the first entity, downloading software offered by the first entity, filling out a form offered by the first entity), cost-per-mille (cost per thousand impressions, or the cost of sending a thousand email messages), click-through-rate (ratio of clicks to impressions), view-through-rate (number of ads a user did not skip over compared to the number of impressions (i.e., ads rendered)), another type of performance metric, or one or more combinations thereof.

Figure 4:
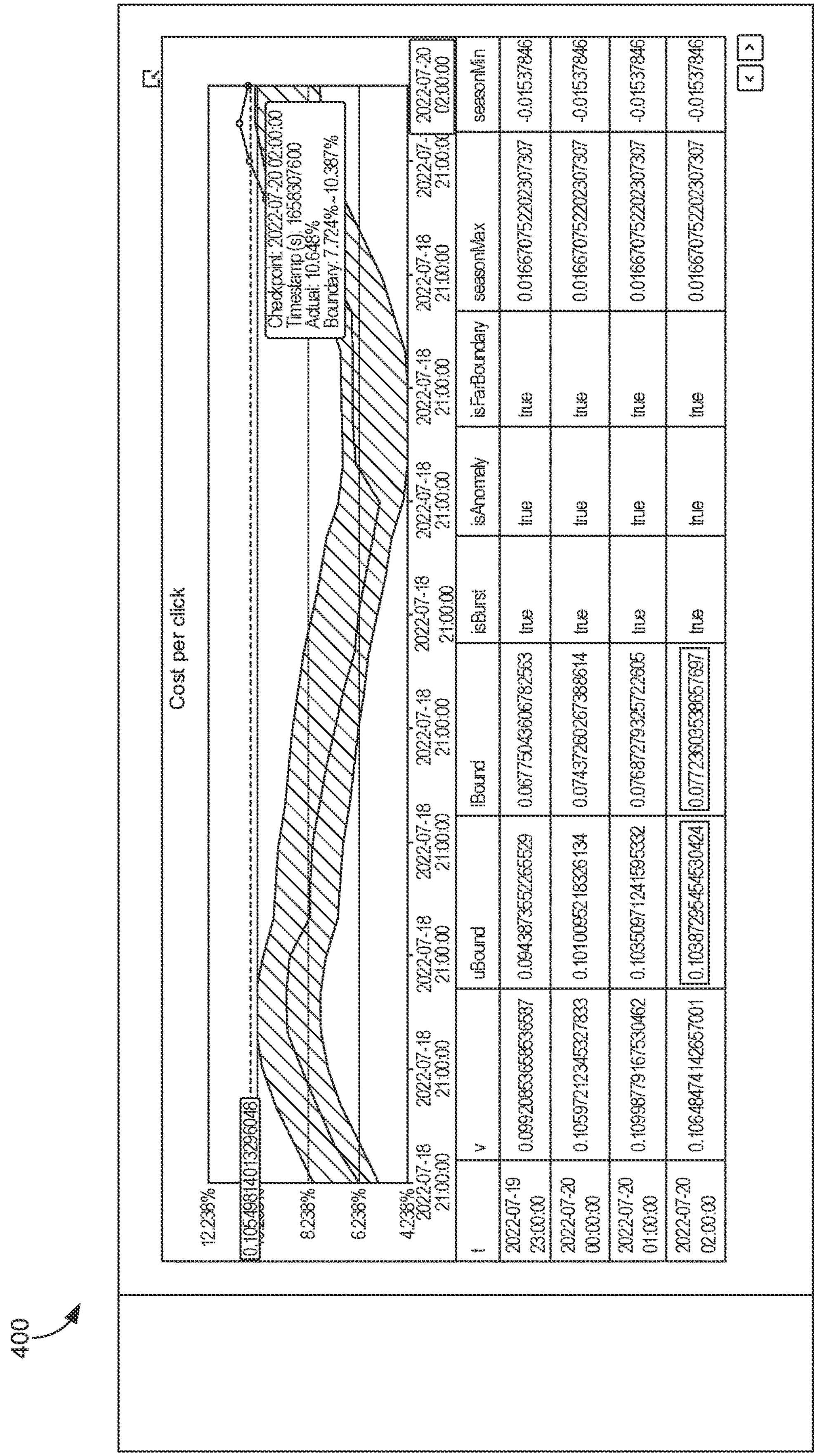
FIG. 4 illustrates an example graph and table generated using a performance anomaly detection model, in accordance with an embodiment described herein.

In embodiments, dashboard 104 can be a graphical user interface providing analytics and management tools for tracking, monitoring, analyzing, and displaying various information related to digital ads for items or services offered by a first entity to a user of a third-party digital service (e.g., a third-party search engine, a third-party application), the various information including the performance metrics of those digital advertisements offered through the third-party digital service. In embodiments, the dashboard 104 can provide one or more visual illustrations (e.g., as illustrated in FIG. 4) of collected datasets from multiple third-party sources and analysis of that data (e.g., performance metrics such as cost-per-click) for anomaly detection (e.g., an anomaly in a cost-per-click time series) and for providing determinations related to one or more causes of the anomaly detection (e.g., a data outage at a particular site, click-fraud at a particular site), as well as for providing remedial actions (e.g., remedial actions generated by remediation engine 126).

The performance anomaly detection model 114 can be configured to communicate with the user device 102 (and dashboard 104), the remediation engine 126, and the alert engine 130 (e.g., over a network, such as the Internet, a local area network, another wide area networks, another type of wireless network, or one or more combinations thereof). For example, the performance anomaly detection model 114 can receive various rules and inputs associated with the sites 106A-106C for anomaly detection. In some embodiments, the performance anomaly detection model 114 receives cost-per-click data for each of the sites 106A-106C and historical cost-per-click data for each of the sites 106A-106C. In some embodiments, the performance anomaly detection model 114 receives other types of performance metrics for each of the sites 106A-106C and historical performance metrics for each of the types of performance metrics for each of the sites 106A-106C. In some embodiments, the performance anomaly detection model 114 can receive the performance metrics (e.g., for digital ads offered by the first entity) from the third-party server 140 or based on user device interactions (e.g., clicks), with digital offers provided by the first entity, of users utilizing a digital service provided by the third-party server 140.

In an example embodiment, the performance anomaly detection model 114 can be applied to a first grouping of historical cost-per-click data, such that an output generated by the performance anomaly detection model 114 is generated based on a cost-per-click data input and the first grouping of the historical cost-per-click data. As one non-limiting illustration, the performance anomaly detection model 114 may receive a time-series of cost-per-click data (e.g., in real time or near real time) for the first site 106A, and may generate an output for anomaly detection based on the time-series cost-per-click data and based on a grouping of historical cost-per-click data for the first site 106A during the same time period and on the same day for the past few weeks or for the same month the previous year (e.g., historical cost-per-click time series generated every Monday from 12:01:00 pm EST to 12:31:00 pm EST for the past few weeks or for each Monday of October of the previous year). In this way, the output that the performance anomaly detection model 114 is generating may be based on a time period corresponding to the cost-per-click data received for the first entity (e.g., corresponding to one or more of the sites 106A-106C).

In some embodiments, the one or more models 116 of the performance anomaly detection model 114 may include a machine learning model, a deep learning model, a neural network, a hidden Markov model, a statistical language model, a natural language processing model, a task flow model, a decision tree model, a regression model, a random forest model, another type of model, or one or more combinations thereof, for anomaly determination and cause identification. For example, the one or more models 116 and the Moving Metric Detector Burst model 118 may be used for detecting anomalies associated with a data outage at a particular site (e.g., site 106A) or updated business analytics 120, such as a change to a spending cap 122 at site 106B, for instance. In an embodiment, the Moving Metric Detector Burst model 118 may be used for generating output for a time series of cost-per-click, and the one or more models 116 may be used for comparing user-generated or artificial intelligence generated feedback with respect to true or false alerts (the alerts being generated via alert engine 130 in response to the output from the Moving Metric Detector Burst model 118). As another example, the one or more models 116 may be used for comparing spend values associated with the first site 106A for a particular time period, such that the spend values can be used to generate a time series of cost-per-click data for input at the Moving Metric Detector Burst model 118. In some embodiments, the one or more models 116 may be used for determining an anomaly threshold.

In embodiments, the Moving Metric Detector Burst model 118 may include a decomposer for decomposing each time series of cost-to-click data to trend, seasonality and residual parts. For example, in an embodiment, the Moving Metric Detector Burst model 118 may include a moving metric decomposer that uses a median associated with historical cost-to-click data to extract trend and seasonality in the time series cost-to-click data without the use of labels in the historical cost-to-click data. As one non-limiting example, the Moving Metric Detector Burst model 118 may utilize the moving metric decomposer and the median for historical cost-to-click data corresponding to the second site 106B associated with a particular city or town for each non-holiday Saturday during a particular time period for a plurality of previous Saturdays to extract trend or seasonality in one or more associated time series of cost-to-click data without the use of labels within the historical cost-to-click data. As another non-limiting example with respect to analyzing time series of cost-to-click data for the first site 106A, the Moving Metric Detector Burst model 118 may utilize the moving metric decomposer and a median for historical cost-to-click data corresponding to the second site 106B and a median for historical cost-to-click data corresponding to the third site 106C, wherein the historical cost-to-click data for both the second site 106B and third site 106C are associated with a particular time period that is also associated with the time series of cost-to-click data for the first site 106A (e.g., considering the medians for the other two sites in the case that there isn't enough data for the first site). In some embodiments, the Moving Metric Detector Burst model 118 may be the Moving Metric Detector Burst model of FIG. 10. In some embodiments, the Moving Metric Detector Burst model 118 can receive an application programming interface (API) and transmit an API response as illustrated in FIG. 8 (e.g., for communications with the user device 102, dashboard 104, remediation engine 126, and alert engine 130).

The performance anomaly detection model 114 may analyze cost-per-click data, other performance data, or one or more combinations thereof, based on one or more of the plurality of business analytics 120 including the spending cap 122 and the cost-per-click cap 124. For example, the performance anomaly detection model 114 may determine whether a data point associated with a time series of cost-per-click data is outside of a predetermined ranged based on the spending cap 122, the cost-per-click cap 124, or one or more combinations thereof. In some embodiments, the user via user device 102 determines one or more of the spending cap 122 and the cost-per-click cap 124. In other embodiments, the one or more models 116 may be used for determining one or more of the spending cap 122 and the cost-per-click cap 124. For example, the one or more models 116 may determine the spending cap 122 or the cost-per-click cap 124 based on historical spending cap values, historical cost-per-click cap values, other business analytics, or one or more combinations thereof. Further, the cost-per-click cap 124 for a particular time series of cost-per-click data associated with a particular time period may be determined based on historical cost-per-click cap values associated with that particular time period. In yet another example, the spending cap 124 for a particular time series of cost-per-click data associated with a particular location may be determined based on historical spending cap values associated with that particular location.

The remediation engine 126 can be configured to communicate with the performance anomaly detection model 114 and the third party server 140 (e.g., to pause digital advertisements by the first entity associated with a detected anomaly). For example, the remediation engine 126 can automatically pause spending for one or more digital ads for the site 106A via the pause spending function 128A based on a detected anomaly associated with cost-per-click data (or other performance metric data) of the first site 106A, automatically pause spending for one or more digital ads for the site 106B via the pause spending function 128B based on a detected anomaly associated with cost-per-click data of for the site 106B, and automatically pause spending for one or more digital ads for the site 106C via the pause spending function 128C based on a detected anomaly associated with cost-per-click data of for the site 106C. The pause spending functions 128A-128C can pause the spending based on a communication with the user device 102, the third-party server 140, or one or more combinations thereof.

The alert engine 130 can provide alerts to the user device 102 based on utilizing the performance anomaly detection model 114 for detecting an anomaly. For example, the alert engine 130 can provide alerts using email 132, a messaging application 134, an SaaS platform 136 (e.g., PagerDuty™), another type of computer-based service, or one or more combinations thereof. For example, the messaging application 134 may transmit an alert or notification to the user device 102 based on the messaging protocol used by the user device 102 or messaging application 134. As another example, the SaaS platform 136 can provide the user device 102 with alerts or notifications via a cloud infrastructure system. In some embodiments, the logic to trigger an alert or notification is decoupled from the logic for determining which user device of a plurality of user devices should receive the alert or notification and the content of the notification.

The scheduler 142 may be configured to communicate with the third-party server 140, and the scheduler 142 may include a distributed file system 144 and ERP System 146. For example, the distributed file system 144 may include a Hadoop Distributed File System (HDFS). For instance, the distributed file system 144 may store large scale data sets including cost-per-click data and other performance metrics associated with each of the sites 106A-106C and stream those data sets at high bandwidth to the performance anomaly detection model 114 (or another user applications e.g., based on certain permissions). Further, the ERP System 146 can be an enterprise software application that employs one or more databases or structured content for the collection of cost-per-click data, other performance metrics associated with the one or more sites 106A-106C, other enterprise resource planning data associated with the first entity (e.g., employee data, other financial information for the first entity, asset data, etc.), or one or more combinations thereof.

In addition to communicating with the third-party server 140 (e.g., via a communication session), the scheduler 142 may also establish a second communication session with a second server hosted by another third-party, one or more additional communication sessions with the third-party server 140 (e.g., one session for cost-per-click data for a first set of digital advertisements, a second session for cost-per-click data for a second set of digital advertisements, a third session for spending cap and cost-per-click cap data, etc.), one or more additional communication sessions with a third server hosted by the other third-party, and so forth. In embodiments, the scheduler 142 may automatically receive cost-per-click data, other performance metrics associated with the one or more sites 106A-106C, other enterprise resource planning data associated with the first entity, or one or more combinations thereof, based on an established communication session.

Figure 2:
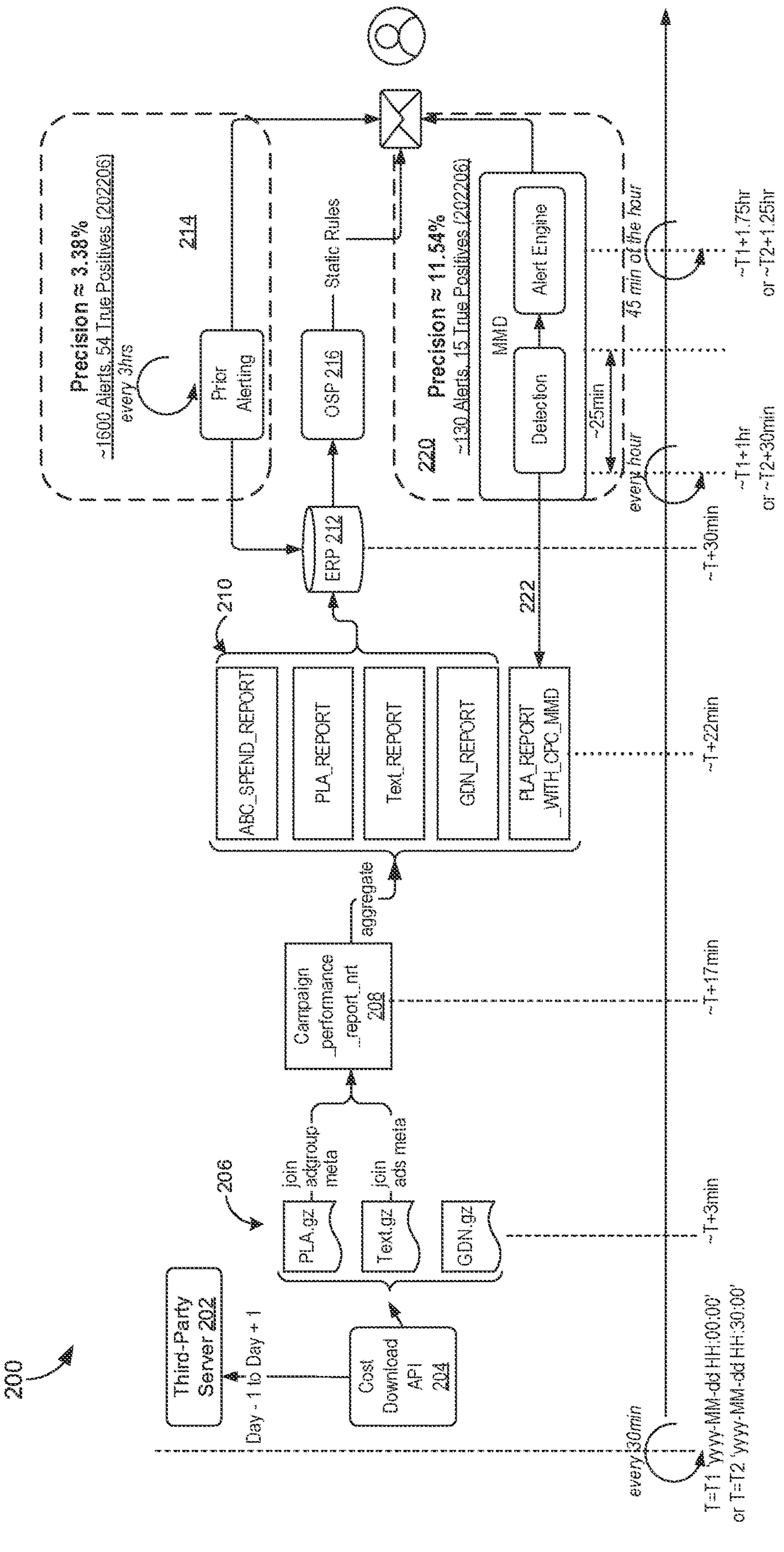
FIG. 2 is another example operating environment suitable for employing a performance anomaly detection model, in accordance with an embodiment described herein.

Turning now to FIG. 2, FIG. 2 illustrates an example timeline 200 with respect to an implementation in which the present disclosure may be employed. The components and architecture of FIG. 2 are intended as examples. For instance, the timeline at ~T+22 minutes may include more or less of reports 210, or other types of reports.

Example timeline 200 depicts a third-party server 202 receiving an application programming interface (API) 206 request for the communication of cost-per-click data associated with a first entity that is different than the third-party server 202. For example, the third-party server 202 hosted by the third-party may comprise one or more computing devices/user devices, servers, databases, or one or more combinations thereof, configured to generate digital content, such as a website or application, for example, which may be accessed over a network (e.g., via a computing device associated with the first entity) based on established communication sessions, such that the first entity can offer an item or service on a third-party application, third-party website, or another digital service provided by the third-party server 202. In some embodiments, the API request 204 to the third-party server 202 can initiate the collection of performance metrics and metadata from various platforms provided by the third-party server (e.g., from product listing ads, text ads (e.g., SlickText), display ads provided by a display network (e.g., Google Display Network)) in one or more data files 206 at ~T+3 minutes based on the API request 204.

In embodiments, one or more API requests 204 can be triggered by a computing device of the first entity for receiving information corresponding to digital offers by the first entity on a third-party digital service hosted by the third-party server 202. The API request 204 may trigger the collection of particular information from one or more API endpoints associated with the third-party server 202. The one or more data files 206 may correspond to a particular time period (e.g., a start time and an end time). For example, the one or more data files 206 collected based on the API 204 may include click data, cost data, spending cap data, cost-per-click data, other types of performance metrics (e.g., cost-per-impression) associated with one or more digital offers by the first entity or one or more groupings of digital offers by the first entity, or one or more combinations thereof.

In embodiments, the one or more data files 206 may include a plurality of digital advertisement formats. For example, one or more of the plurality of digital advertisement formats may correspond to Product Listing Ads (PLA) that display additional information in addition to text-based ads (e.g., digital shopping ads on Google Search, Google Shopping, Google Image Search, dynamic product ads on Facebook and Instagram, etc.), and may also include metadata grouped by particular digital ad groups for a particular item or group of items (e.g., grouped based on item features, categories, or a particular seller). As another example, one or more of the data files 206 may correspond to text-based ads or display network ads (e.g., Google Display Network ads, an online auction application in which ads participating in an online auction are input to an ad server to determine which of those ads will win the auctions, etc.), and may also include metadata grouped by particular digital ad groups for a particular item or service, or group of items or services. In embodiments, each of the data files 206 can include cost-per-click data for digital offers by the first entity. In some embodiments, metadata (e.g., metadata corresponding to the cost-per-click data) can be extracted from each of the data files 206. In some embodiments, one or more of the data files 206 may correspond to different third-parties or different third-party servers.

In embodiments, one or more campaign performance reports 208 can be generated from the data files 206 (e.g., at ~T+17 minutes). For example, the campaign performance report 208 can be generated from the metadata of the data files 206 that corresponds to the cost-per-click data. In some embodiments, the campaign performance report 208 can be generated based on a first grouping of metadata for a first set of items having a first seller. In some embodiments, the campaign performance report 208 can be generated based on a first grouping of metadata for a first set of items of a first category (e.g., baby formula). In embodiments, the campaign performance report 208 may include one or more of a campaign name, a type of offer associated with the campaign (e.g., text ad for an item, text ad for a service, a sponsored update, a display network ad, a video ad), an audience size, a daily budget, a total budget, a bid price, a duration, a number of active ads, a number of content items or services, cost-per-click data and corresponding time stamps, other types of performance metrics, another type of campaign performance report data, or one or more combinations thereof. In a non-limiting example, the campaign performance report 208 may indicate that a particular digital advertisement having an impression or user interaction based on a keyword (e.g., "moon") had 15,000 impressions (i.e., presented to users of a third-party digital service provider 15,000 times), 918 clicks, and 15 conversions.

In embodiments, a plurality of reports 210 are generated using the campaign performance report 208 (e.g., at ~T+22 minutes). In one embodiment, a spend report of the plurality of reports 210 can be generated based on the campaign performance report 208 that is associated with one or more of the data files 206, a PLA report can be generated based on the campaign performance report 208 that is associated with one or more of the data files 206, a text report can be generated based on the campaign performance report 208 that is associated with one or more of the data files 206, and a display network report (e.g., Google Display Network) can be generated from based on the campaign performance report 208 that is associated with one or more of the data files 206. In some embodiments, one or more of the plurality of reports 210 can be generated an aggregation of the one or more of the data files 206 (e.g., an aggregation of the cost-per-click data from a plurality of sites, such as sites 106A-106C of FIG. 1, or an aggregation of the cost-per-click data from the data files 206). In some embodiments, one or more of the plurality of reports 210 can be generated from metadata (e.g., metadata corresponding to cost-per-click data) extracted from the plurality of reports 210. In some embodiments, one or more of the plurality of reports 210 can be generated from click data, cost data, spending cap data, cost-per-click data, other types of performance metrics associated with one or more digital offers by the first entity or one or more groupings of digital offers by the first entity, or one or more combinations thereof, extracted from the campaign performance report 208. For example, one or more of the plurality of reports 210 can be generated from an aggregation of cost-per-click data for a particular time period, the cost-per-click data being associated with one or more digital offers by the first entity or one or more groupings of digital offers by the first entity.

One or more of the plurality of reports 210, or particular information extracted therefrom, can be used as input into a performance anomaly detection model 220 for anomaly detection (e.g., at ~T1+1 hour or ~T2+30 minutes corresponding to the timeline) and alerting via an alert engine (e.g., at ~T1+1.75 hour or ~T2+1.25 minutes corresponding to the timeline). In some embodiments, the performance anomaly detection model 220 can perform operations similar to the performance anomaly detection model 114 of FIG. 1. As another example, in some embodiments, the alert engine of the performance anomaly detection model 220 is the same or similar to the alert engine 130 of FIG. 1. In embodiments, the one or more of the plurality of reports 210 can be processed by ERP 212 and Open Source Platform (OSP) 216 before providing input the performance anomaly detection model 220.

In embodiments, the ERP 212 can include a software application or suite of software applications that collect, store, manage, and further process one or more of the plurality of reports 210, and one or more databases for storing the operations performed on the plurality of reports 210 or portions thereof. In some embodiments, the ERP 212 can enrich or match data (e.g., cost-per-click data) within the one or more of the plurality of reports 210 (e.g., based on business analytics 120 of FIG. 1). The ERP 212 may also merge data sets (e.g., associated with particular cost-per-click data) from each of the plurality of reports 210. In some embodiments, the OSP 216 (e.g., Grafana visualization or Prometheus visualization) can additionally be applied to the one or more of the plurality of reports 210, such that a particular set of cost-per-click data is further managed or processed. For example, a first group of cost-per-click data corresponding to a first predetermined time period can be identified and a second group of cost-per-click data corresponding to a first predetermined time period that is a later time period than the first predetermined time period can be identified to apply particular rules (e.g., the business analytics 120 of FIG. 1) to each of the first group and second group. In this way, the first group can be provided to the performance anomaly detection model 220 as input for anomaly detection (e.g., at ~T1+1 hour corresponding to the timeline) and the second group can be provided to the performance anomaly detection model 220 as input for anomaly detection (e.g., at ~T2+30 minutes corresponding to the timeline).

In one example embodiment, the performance anomaly detection model 220 can detect for anomalies based on inputs every hour using one or more of the plurality of reports 210 for one or more performance metrics corresponding to the one or more of the plurality of reports 210. In some embodiments, the anomaly detection via the performance anomaly detection model 220 may occur for about twenty five minutes. Based on an anomaly detection for a performance metric via the performance anomaly detection model 220, the performance anomaly detection model 220 can provide one or more alerts or notifications to a user device associated with the first entity, as well as providing a report for particular cost-per-click data 222.

In some embodiments, the performance anomaly detection model 220 is trained using groupings of historical cost-per-click data for anomaly detection of cost-per-click data associated with one or more of the plurality of reports 210. As an example, the performance anomaly detection model 220 can be trained using a first group of historical cost-per-click data for display network ads (e.g., Google Display Network ads, an online auction application in which ads participating in an online auction are input to an ad server to determine which of those ads will win the auctions, etc.) corresponding to one or more historical campaign performance reports and a second group of historical cost-per-click data for Product Listing Ads (PLA) that display additional information in addition to text-based ads (e.g., digital shopping ads on Google Search, Google Shopping, Google Image Search, dynamic product ads on Facebook and Instagram, etc.) corresponding to one or more historical campaign performance reports.

As another example, the performance anomaly detection model 220 can be trained using first group of historical cost-per-click data (e.g., historical time series including cost-per-click data) for text-based ads corresponding to a third-party digital service for a first season (e.g., a holiday season or a season associated with the weather) and corresponding to one or more historical campaign performance reports, and second group of historical cost-per-click data for text-based ads corresponding to a different third-party digital service for the first season and corresponding to one or more historical campaign performance reports, and a third group of historical cost-per-click data for text-based ads corresponding to the third-party digital service for a second season. Additionally or alternatively, the performance anomaly detection model 220 can be trained using historical cost-per-click data corresponding to a particular geographical area. For example, the performance anomaly detection model 220 can be trained using first group of historical cost-per-click data corresponding to the first entity and for a particular time period (e.g., every Friday for a particular set of weeks) and corresponding to a third-party digital service provided by a third-party server located in a first town or city, and second group of historical cost-per-click data corresponding to the first entity and for the particular time period and corresponding to the third-party digital service provided by a third-party server located in a second town or city that is different than the first town or city.

Based on utilizing one or more of the plurality of reports 210, training the performance anomaly detection model 220 (e.g., using cost-per-click data from historical campaign performance reports), and based on utilizing the performance anomaly detection model 220 (e.g., using a moving average during a particular time period, described herein with respect to FIG. 10), the performance anomaly detection model 220 can generate (e.g., via the alert engine) alerts without false positives faster (e.g., prior systems and methods 214 that only use general rule-based approaches of setting bidding adjustments that take up to three hours for alert-based detection, which causes spend to increase at a significant rate before detection) and more efficiently (e.g., prior systems and methods that use static rules to generate alerts generate too many false positives, and detection is 3.4 times less precise, which can be determined using example formulas from example table 1200 of FIG. 12).

Figure 3:
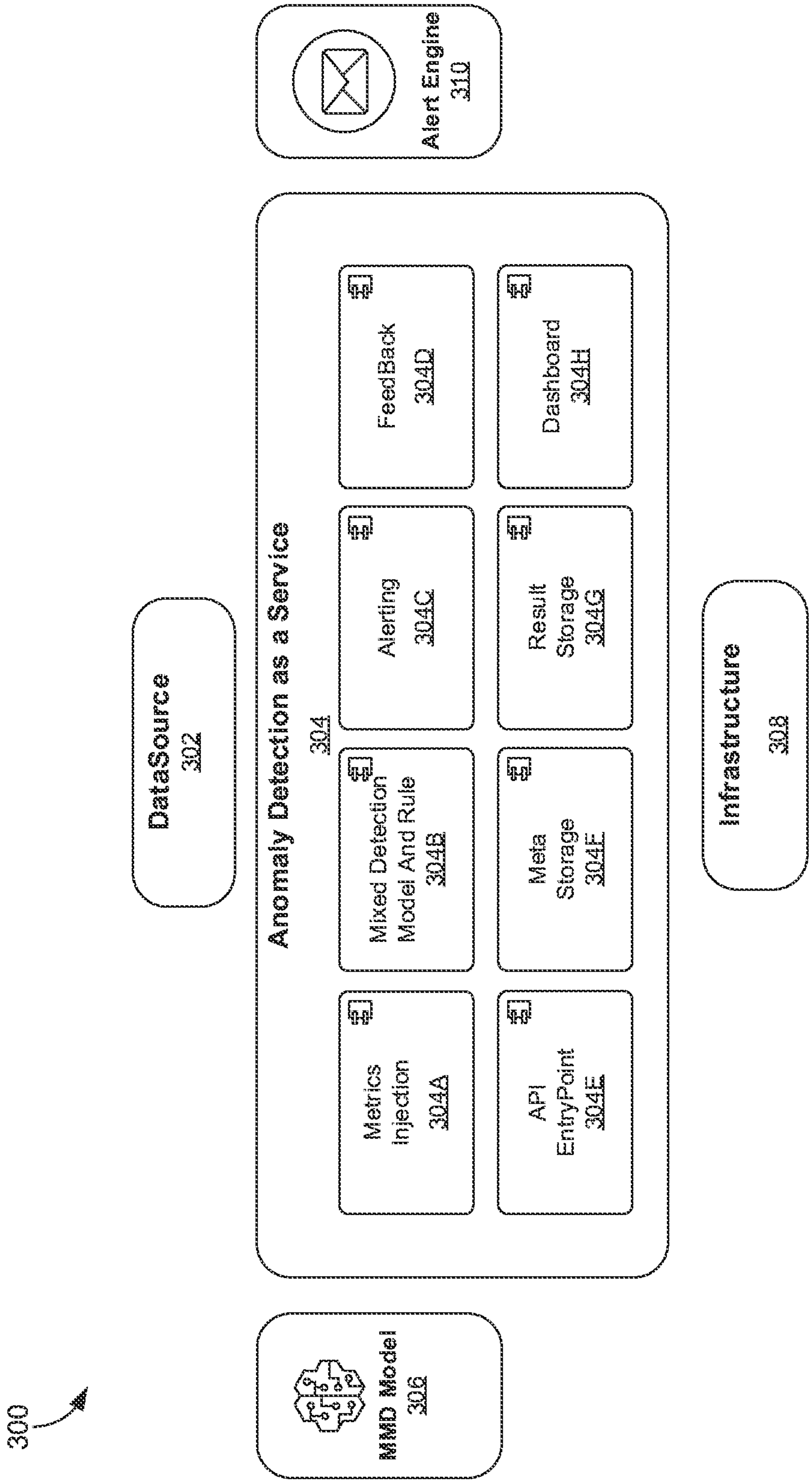
FIG. 3 is another example operating environment suitable for employing a performance anomaly detection model, in accordance with an embodiment described herein.

Turning now to FIG. 3, FIG. 3 illustrates example operating environment 300 in which implementations of the present disclosure may be employed. Example operating environment 300 includes data source 302, anomaly detection as a service 304, MMD Model 306, infrastructure 308, and alerting engine 310. The components and architecture of FIG. 3 are intended as an example illustration. For instance, the data source 302 may include a plurality of data sources.

The data source 302 may include a Not-Only/Non Structured Query Language (NoSQL) database that supports SQL-like query languages or that sits alongside one or more SQL databases in a polyglot persistence architecture. For example, the NoSQL database may be an organized collection of data (e.g., cost-per-click data, time series of cost-per-click data, other time series of performance metrics) modeled in a form other than tabular relations that is accessible via network. For instance, an API call can transmit a query to the NoSQL database for extraction of particular cost-per-click data or other performance metrics associated with offers by a first entity through a third-party digital service provider. In one embodiment, a user device transmits the request to NoSQL database for a specific document. In another embodiment, the NoSQL database may utilize query languages similar to SQL or may sit alongside a relational model database (e.g., including a table having data that corresponds to a relationship between queries of an API call) of the data source 302 in a polyglot persistence architecture.

In some embodiments, data source 302 may correspond to a distributed computing platform for data processing such as, for example, Apache Fink®, Apache Storm, Apache Spark®, Apache Kafka® Streams, Apache Hadoop®, Apache Hive, Splunk®, Amazon Kinesis®, SQLstream®, Elastisearch, Statistical Analysis System (SAS®), The Information Bus Company (TIBCO) StreamBase®, International Business Machines Corporation (IBM) InfoSphere® Streams, another type of distributed computing platform, or one or more combinations thereof. In an example embodiment, the data source 302 may include a Hadoop® distributed filesystem (HDFS) (e.g., that provides horizontal data partitioning that can reduce latency and increase throughput). In another example, the data source 302 may be configured with the distributed framework (e.g., Hadoop®, etc.) to perform real-time or batch-based parallel processing of cost-per-click data, cost-per-click time series data, or other performance metrics, which may be provided by one or more components of example operating environment 300.

The anomaly detection as a service 304 may store data at the data source 302 and extract data from the data source 302. The anomaly detection as a service 304 may include metric injections 304A, mixed detection model and rules 304B (e.g., such as the one or more models 116 or the plurality of business analytics 120 of FIG. 1), alerting component 304C (e.g., configured to communicate with alert engine 310, which may be similar or identical to the alert engine 130 of FIG. 1), feedback 304D, an API entry point 304E, a metadata storage component 304F (e.g., for storing metadata of the one or more data files 206 of FIG. 2), a results storage component 304G (e.g., for storing anomaly detections), and a dashboard component 304H (e.g. for communicating with the dashboard 104 of FIG. 1).

For example, in an embodiment, the anomaly detection as a service 304 may utilize the metric injections 304A for consumption of collected metrics (e.g., the cost-per-click data, cost-per-click time series data, or other performance metrics) into a specified format and may store the formatted metrics into the data source 302 or the metadata storage component 304F of the anomaly detection as a service 304. In an illustrative example, the anomaly detection as a service 304 may utilize the metric injections 304A for formatting the campaign performance report 208 of FIG. 2. For instance, the anomaly detection as a service 304 may utilize the metric injections 304A to format a cost-to-click time series for the plurality of reports 210 or particular cost-per-click data 222 generated by the performance anomaly detection model of FIG. 2 (e.g., formatted based on one or more of the campaign name, type of offer associated with the campaign, audience size, daily budget, total budget, bid price, duration (e.g., for one hour during a particular day), a number of active ads at a particular site for a particular time period, a number of content items or services associated with the active ads, or one or more combinations thereof).

In embodiments, the mixed detection model and rules 304B of the anomaly detection as a service 304 can fine-tune the MMD model 306 for a particular performance metric. For example, the mixed detection model and rules 304B can be used to fine-tune the MMD model 306 for cost-per-click data based on time stamps corresponding to cost-per-click data, based on a location of a third-party server that collected the cost-per-click data, based on a daily or hourly budget in which a click associated with the cost-per-click data occurred, based on the type of digital ad associated with the cost-per-click data, based on a particular item or service being offered that was associated with the cost-per-click data, or one or more combinations thereof. In some embodiments, the mixed detection model and rules 304B of the anomaly detection as a service 304 can be used for grouping particular historical cost-per-click data or other historical performance data. For example, the historical cost-per-click data may be grouped based on one or more of a timestamp or a duration of the digital ad associated with the cost-per-click data. In some embodiments, the historical cost-per-click data groupings may be based on particular geographical locations associated with the cost-per-click data (e.g., a particular country, state, town, city, province, region, street, etc.).

Figure 5:
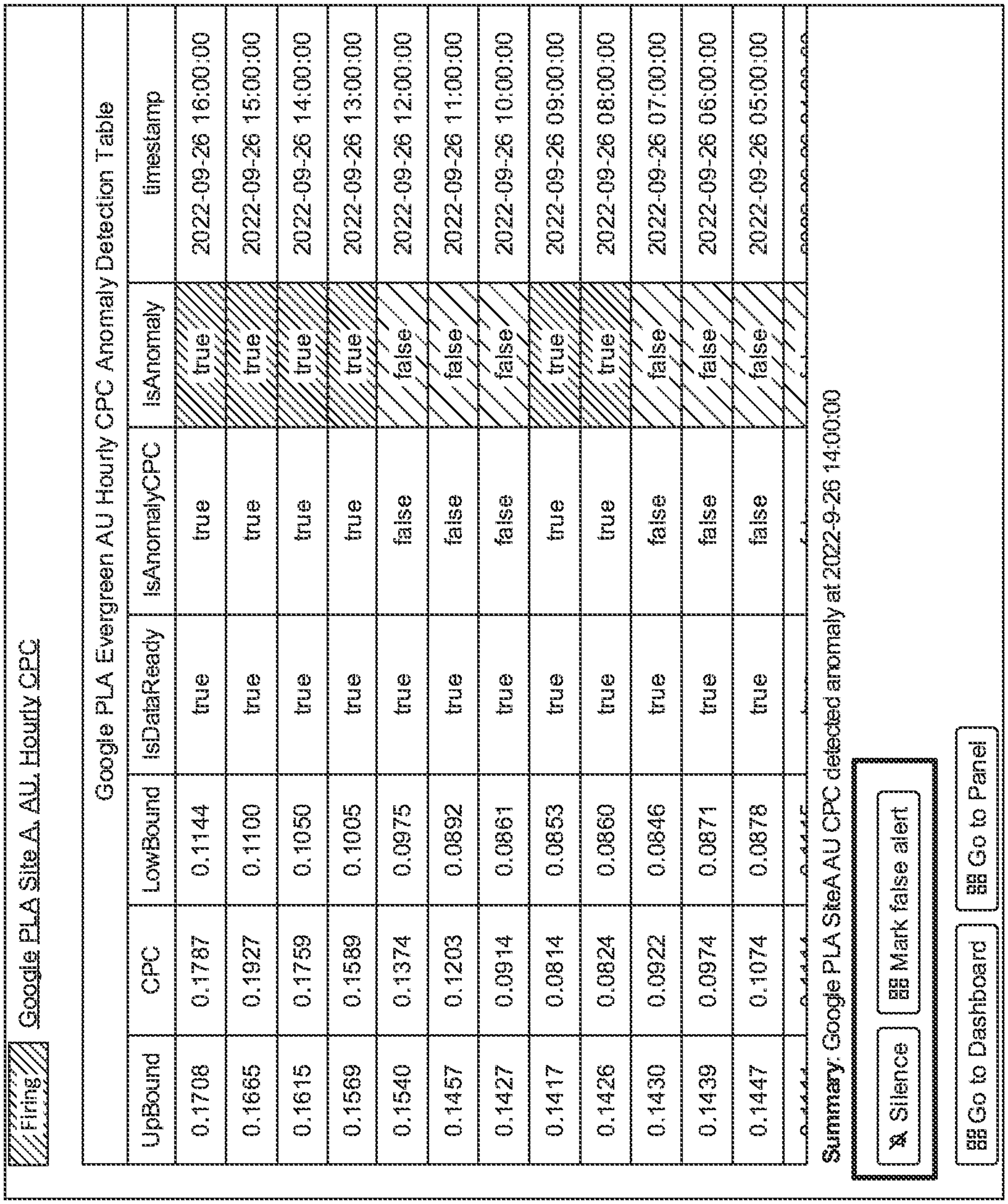
FIG. 5 illustrates another example table generated using a performance anomaly detection model, the table including alert functionality associated with the anomaly detection, in accordance with an embodiment described herein.

In an example embodiment, the alerting component 304C can generate anomaly alerts, such as the example alerts illustrated in the "IsAnomaly" column of FIG. 5. In embodiments, the feedback 304D can be generated by a user via a user device or an artificial intelligence model. For example, the artificial intelligence model can be updated via an AI cloud service that uses machine learning to identify a false anomaly detection and to update the MMD model 306 based on the false anomaly detection. For example, the artificial intelligence model can be trained to identify a false anomaly using a training dataset (e.g., stored in the data source 302), generated from historical indications from a user device indicating that the anomaly detection is a false anomaly detection. In some embodiments, the feedback 304D can also include indications from the user device that the anomaly detection is a false anomaly detection (e.g., such as the indications illustrated in FIG. 13 for "not valid—suspicious data" or "not valid—expected pattern"). In some embodiments, a false anomaly detection can correspond to one or more of the true positive rate, false positive rate, specificity true negative rate, or false positive rate of FIG. 12.

Figure 9:
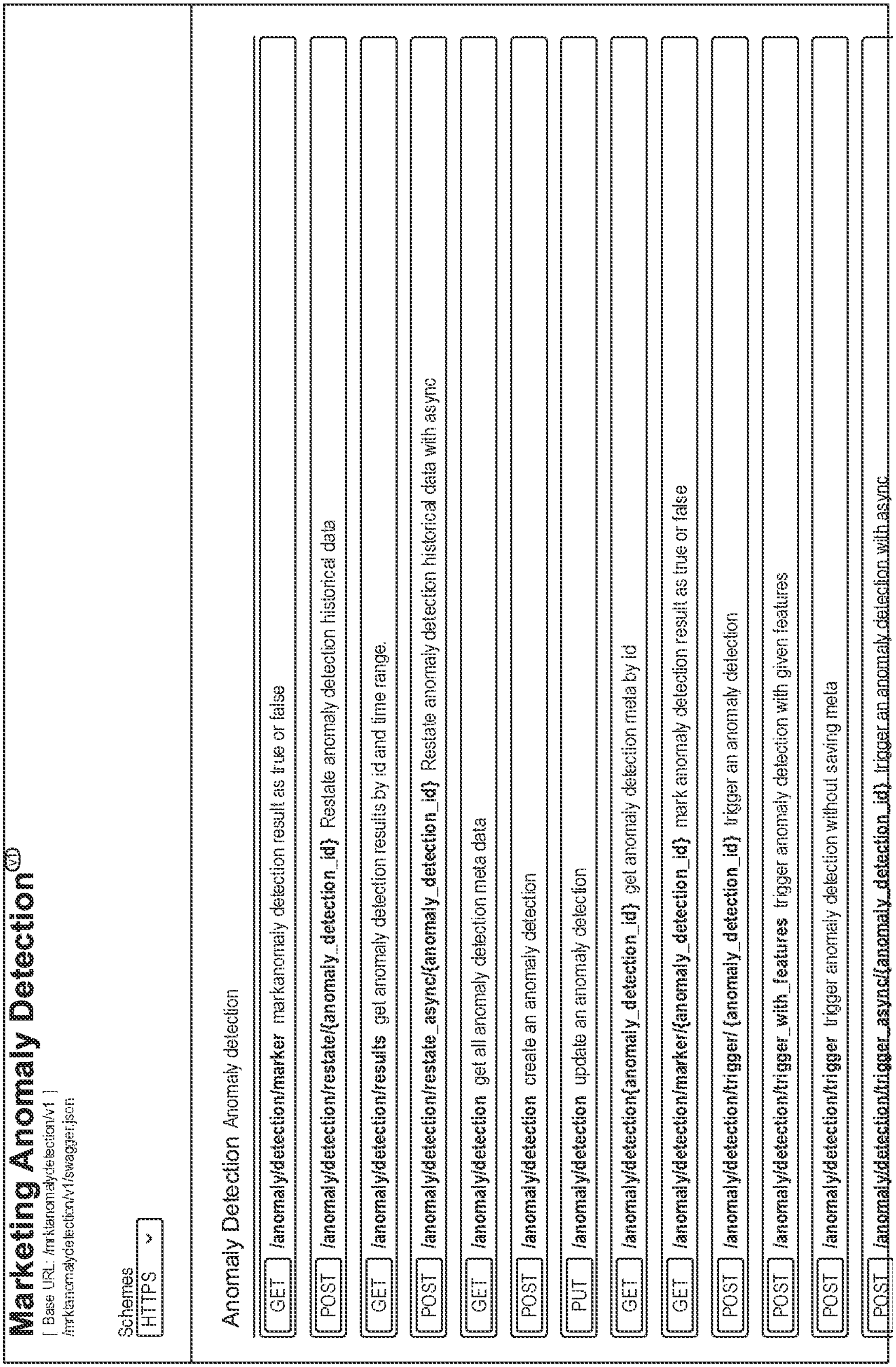
FIG. 9 illustrates examples for an anomaly detection service API, in accordance with an embodiment described herein.

In some embodiments, the API entry point 304E can correspond to the API request and response of FIG. 8, or the customized APIs illustrated in example environment 900 of FIG. 9 (e.g., including an API to get all anomaly detection metadata or historical anomaly detection data). In some embodiments, the dashboard 304H can provide for display one or more of FIGS. 4-7 and 13. In some embodiments, the dashboard 304H can be generated based on updating or fine-tuning the MMD model 306. In some embodiments, the MMD model 306 can be updated based on changing a symmetric moving average for a previous set of cost-per-click data time series based on a different time and date corresponding to a second set of cost-per-click data time series.

In embodiments, the infrastructure 308 may include a verification and authentication service (e.g., NuData) for verifying and authenticating transmission of the cost-per-click data or other performance data (e.g., between the anomaly detection as a service 304 and data source 302). In some embodiments, the infrastructure 308 can provision third-party digital service provider services that can include one or more of authentication, authorization, console, service registry, security, monitoring, alerting, start/stop, expand, restart, certification revocation, backup/restore, or one or more combinations thereof (e.g., via Apache Airflow). In some embodiments, some of these provisioned third-party digital service provider services may be provided by scripts executing in the provisioning service. In these environments, on-going security and compliance can be enabled and enforced (e.g., by using managed encryption (managed keys), automated controls, high level auditing (e.g., of instance level vulnerability scans and intrusion detection, centralized security and log aggregators with high level dashboards), and centralized network control over egress and policies associated with the firewall).

FIG. 4 illustrates an example dashboard 400 (e.g., the dashboard generated based on output provided by the performance anomaly detection model such that an anomaly detection is displayed on a user device via a table and graph). As illustrated by the graphical depiction of the performance anomaly detection model output, anomaly detections associated with cost-per-click data are determined. Each of the detected anomalies is associated with an upper boundary (e.g., the "uBound" column) and a lower boundary (e.g., the "lBound" column) and a seasonal minimum. In some embodiments, the performance anomaly detection model can process cost-per-click data within hourly intervals. In some embodiments, users can pause one or more particular alerts associated with example dashboard 400.

FIG. 5 illustrates an example email alert 500 with a dashboard table embedded, the embedded table corresponding to anomaly detections associated with cost-per-click (CPC) data. The embedded dashboard table includes selectable icons that, upon selection, can silence or mute an alert for a particular time period (e.g., mute an alert for the next one or more hours). The embedded dashboard table can also include a "mark false" selectable icon, such that upon selection of the "mark false" icon, a signal can be transmitted to notify another user device (e.g., a user device associated with the first entity). In some embodiments, selections of the "mark false" icon can be used to generate further input or training data into the performance anomaly detection model to update the model. In embodiments, the example email alert 500 may include selectable links, wherein upon selection of the link, a webpage or application is launched to provide additional details to the performance metrics and further details with respect to these metrics. Additionally, each of the CPC data within the email alert 500 can have a corresponding upper and lower boundary and timestamp. The example email alert 500 can be associated with hourly generated CPC data for a particular third-party platform within a particular geographical area (e.g., Australia).

Figure 6:
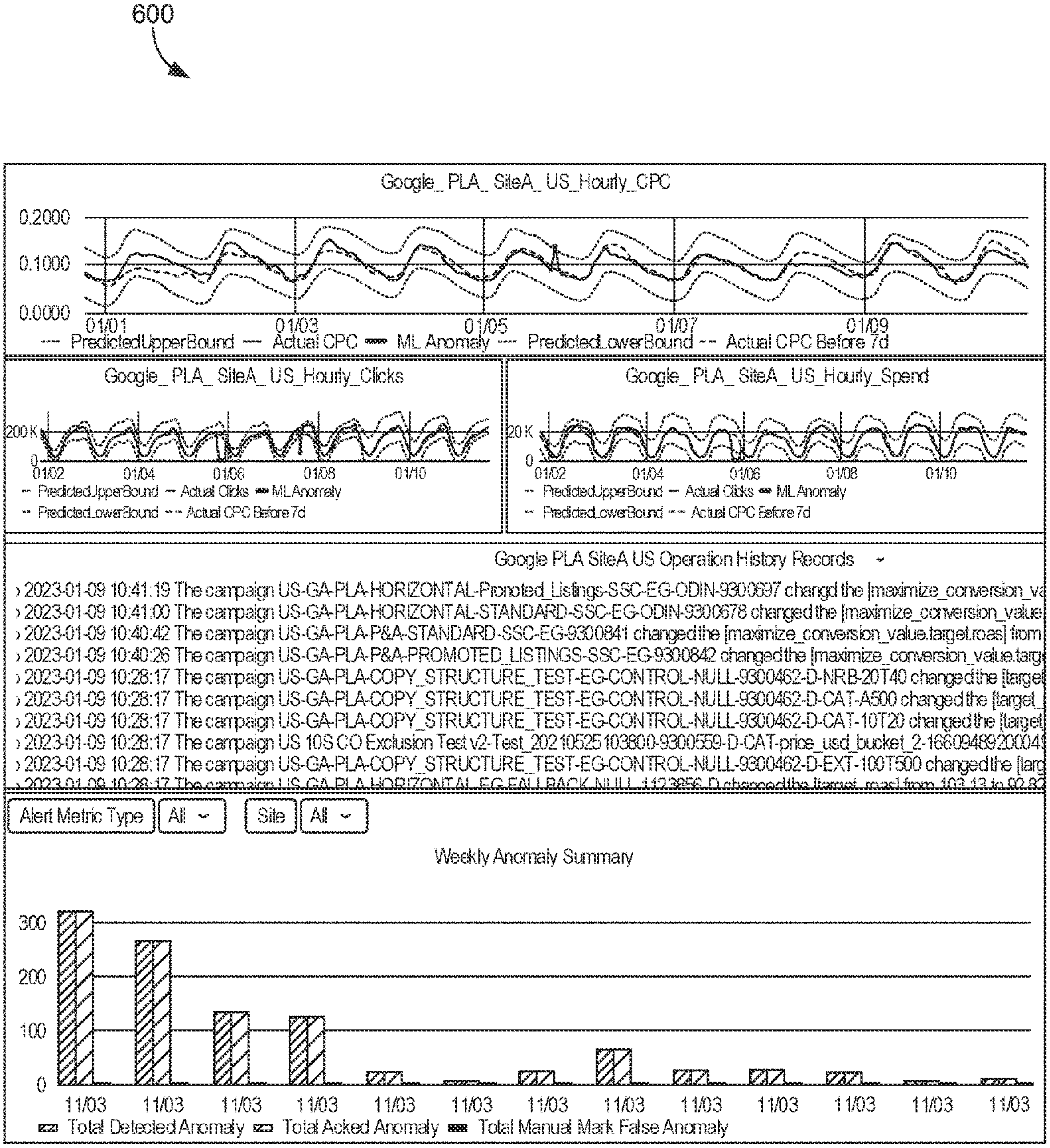
FIG. 6 illustrates example graphs including one or more anomalies detected using a performance anomaly detection model, a snapshot of historical performance metrics, and a weekly anomaly summary, in accordance with an embodiment described herein.
Figure 7:
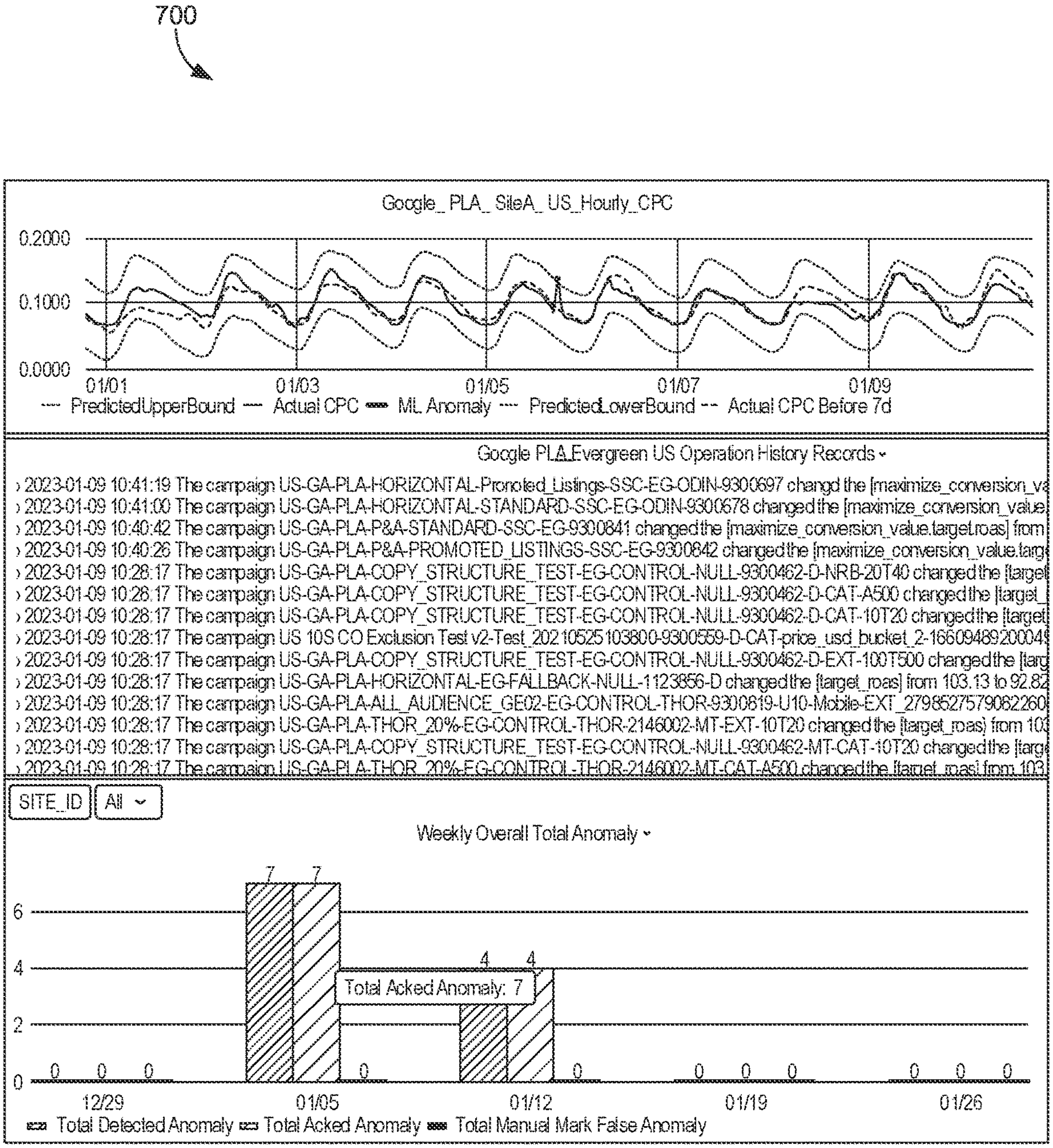
FIG. 7 illustrates an example graph including an anomaly detected using a performance anomaly detection model, a snapshot of historical performance metrics, and a weekly anomaly summary, in accordance with an embodiment described herein.

FIGS. 6-7 illustrate example dashboards 600 and 700 including anomaly detections for hourly received CPC data for a particular third-party platform associated with a particular geographical area (e.g., U.S.), as well as anomaly detections for hourly received click and spend data. The graphs include predicted upper and lower boundaries. A sharp point within the graph indicates an anomaly. The dashboards 600 and 700 also include a weekly summary for each of the detected anomalies. As noted above, FIG. 8 illustrates an example API request and response associated with the performance anomaly detection model, and example environment 900 of FIG. 9 includes customized APIs including anomaly detection historical data responses, anomaly detection metadata requests, anomaly detection triggers (e.g., for a given feature, such as anomalies above a threshold or anomalies for a particular set of offered items), and other APIs.

FIG. 10 illustrates an example MMD model 1000, and FIG. 11 includes a chart 1100 comparing the differences between the prior technologies and the presently disclosed technology. For example, example MMD model 1000 includes an anomaly detection algorithm, called Moving Metric Detector (MMD), capable of identifying potential alerts for particular anomalies associated with cost-per-click data or other performance metrics with distribution agnostic criteria. The MMD model 1000 can decompose a cost-per-click data time series to identify anomalies in patterns (e.g. based on a trend or a particular season or time period) as well as residuals.

In some embodiments, to identify true anomalies, a Chebyshev's Inequality can be used to determine anomaly criteria to control for overall false positive detection rate. The MMD model 1000 can learn patterns in the time series and use it as prediction to test if the last observation is within various cost-per-click data ranges (e.g., associated with the upper and lower boundaries illustrated in FIGS. 4-5 and 6-7). For a cost-per-click data time series X, an estimated trend L can be determined using a symmetric moving average with a sliding time window (w), which may be the number of CPC observations for a particular time series X. To determine the window (w) for each CPC metric, a single signal frequency estimation can be determined using an ESPRIT method (e.g., an estimation of signal parameters via rotational invariant techniques (ESPRIT) for determining parameters of a mixture of sinusoids within background noise). Using the trend L, seasonality can be determined for reducing the variance in X. To extract a robust seasonality (S), a median of historical periodic values of trend-removed time series L' can be used, in some embodiments, instead of an average, which may be more sensitive to outliers. As illustrated in FIG. 10, (w) is the number of observations per cycle, (i) is the number of cycles away from observation at (t), and $\tau$ is the number of cycles near the observation at t that is used to estimate seasonality ($S_t$). Further, $\tau$ can be set as a length of the input CPC time series X.

Figure 13:
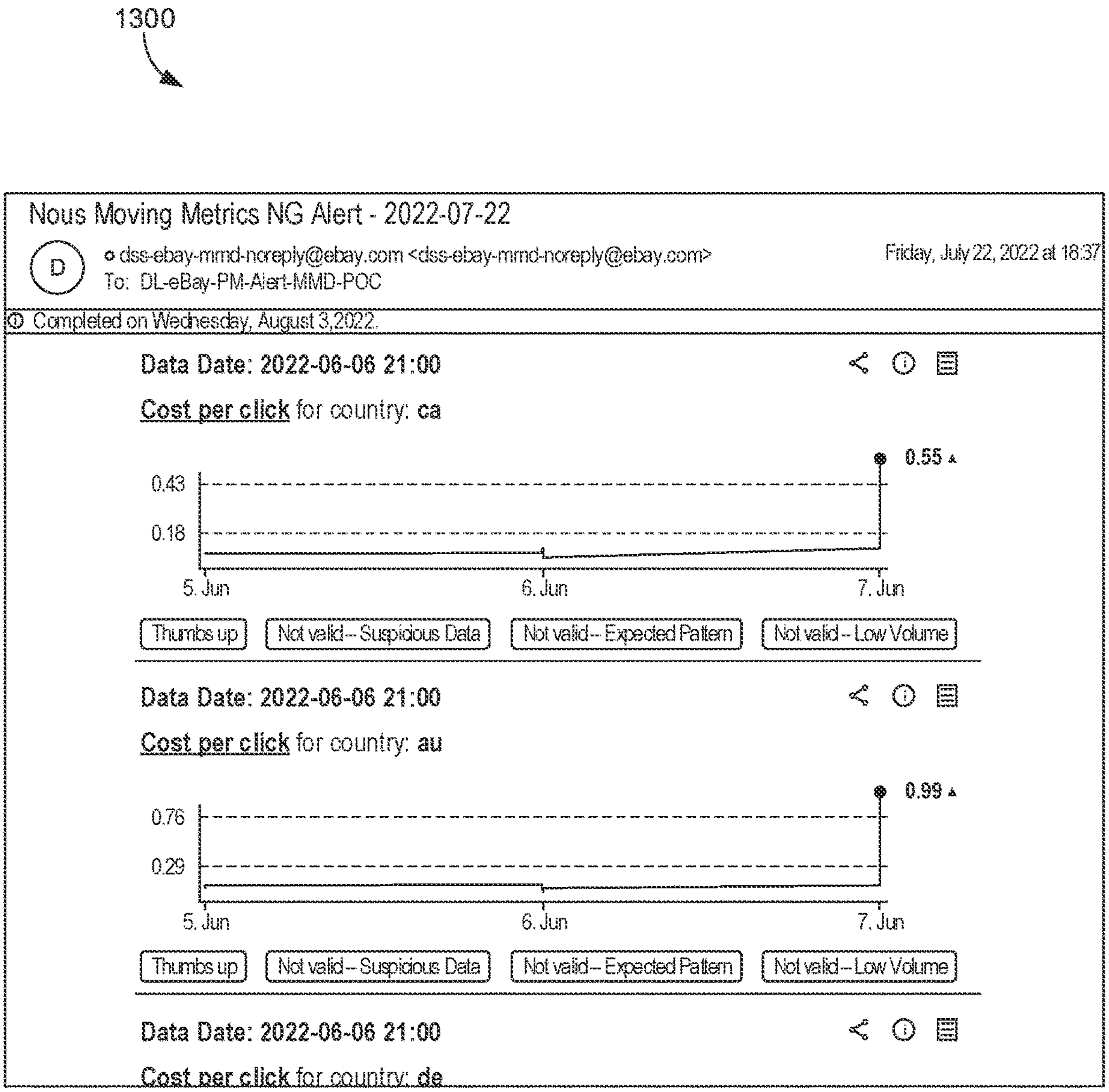
FIG. 13 illustrates example alerts for different countries upon an anomaly detection by a performance anomaly detection model, in accordance with an embodiment described herein.

As noted above, FIG. 12 includes example table 1200 for comparing the precision and accuracy of the anomaly detections by the present technology to the detections by the prior technologies. FIG. 13 includes example email alert 1300 having a single data point chart embedded, the single data point chart including moving metrics associated with cost-per-click data within Canada, Australia, and Germany (e.g., including invalid indications of a detected anomaly).

Figure 14:
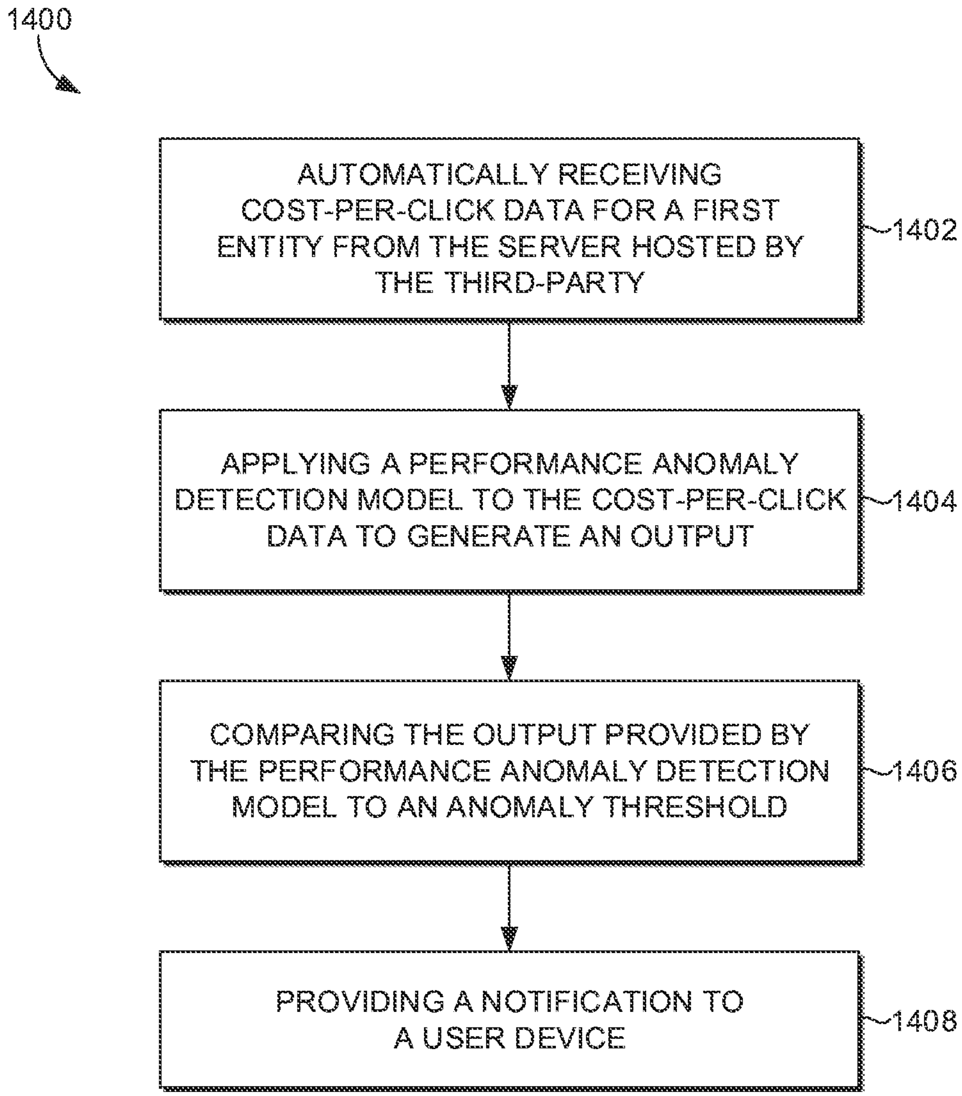
FIG. 14 illustrates an example flowchart corresponding to anomaly detection, in accordance with an embodiment described herein.
Figure 15:
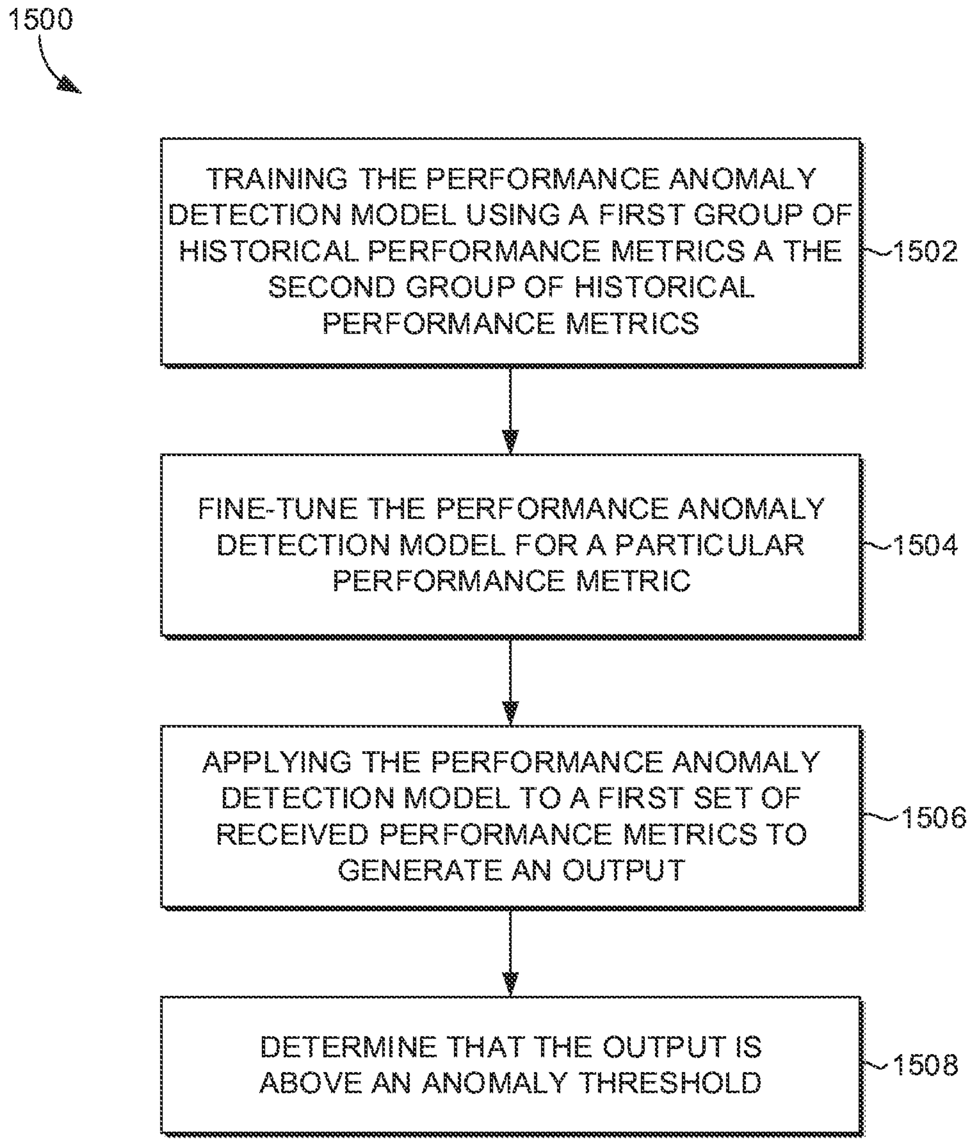
FIG. 15 illustrates another example flowchart corresponding to anomaly detection, in accordance with an embodiment described herein.

FIGS. 14-15 include example flowcharts.

Flowchart 1400 of FIG. 14 begins at step 1402 with automatically receiving cost-per-click data for a first entity from the server hosted by the third-party. In embodiments, the performance metrics can be automatically received (e.g., using API entry point 304E of FIG. 3) from the third party server 140 of FIG. 1 or the third-party server 202 of FIG. 2. In embodiments, the cost-per-click data is automatically received at periodic intervals (e.g., within hourly time frames). Historical cost-per-click data can also be received for the first entity from the server hosted by the third-party.

At step 1404, a performance anomaly detection model is applied to the cost-per-click data to generate an output. In embodiments, the performance anomaly detection model includes a time-series model, and can also apply a maximum mean discrepancy. For example, the maximum mean discrepancy can be a frequentist measurement of a similarity between CPC distributions, which may be used for training one or more generative models of the performance anomaly detection model. The performance anomaly detection model can also be applied to the cost-per-click data received from a second server associated with the third-party to generate a second output (e.g., to generate the output illustrated in FIG. 13 for the different countries).

At step 1406, the output provided by the performance anomaly detection model is compared to an anomaly threshold. In embodiments, the anomaly threshold is determined based on historical cost-per-click data or other business analytics 120 of FIG. 1. As an example, the anomaly threshold may be based on a spending cap associated with the first entity for a particular country. Further, based on determining that the output is above the anomaly threshold, a notification can be provided to a user device at step 1408. For example, the notification can correspond to remediation engine 126 or alert engine 130 of FIG. 1.

Flowchart 1500 of FIG. 15 begins at step 1502 with training the performance anomaly detection model using a first group of historical cost-per-click data and a second group of historical performance metrics. In embodiments, the first and second group each correspond to different geographical locations. In some embodiments, the first group includes particular cost-per-click data for a first set of items offered on a digital platform and the second group includes particular cost-per-click data for a second set of items. In some embodiments, the first group is grouped based on particular days (e.g., the first Monday of each month during the summer). In some embodiments, the first group includes historical cost-per-click data for display network ads (e.g., Google Display Network ads, an online auction application in which ads participating in an online auction are input to an ad server to determine which of those ads will win the auctions, etc.) and the second group includes historical cost-per-click data for Product Listing Ads (PLA) (e.g., digital shopping ads on Google Search, Google Shopping, Google Image Search, dynamic product ads on Facebook and Instagram, etc.).

Step 1504 includes fine-tuning the performance anomaly detection model for a particular performance metric. In embodiments, the performance anomaly detection model can be fine-tuned based on time stamps corresponding to cost-per-click data, based on a location of a third-party server transmitting the cost-per-click data, based on a daily or hourly budget in which a click associated with the cost-per-click data occurred, based on the type of digital ad associated with the cost-per-click data, based on a particular item or service being offered that was associated with the cost-per-click data, another type of fine-tuning parameter, or one or more combinations thereof. For example, the performance anomaly detection model can be fine-tuned based on Product Listing Ads in Canada for items being offered on the Product Listing Ads, the items being of a particular category (e.g., dog food). As another example, the performance anomaly detection model can be fine-tuned based on display network ads in Germany for items being offered on the display network ads, the items being sold by a particular seller.

At step 1506, the performance anomaly detection model can be applied to a first set of performance metrics. For example, the performance anomaly detection model can be applied to the cost-per-click data from a third-party server for anomaly detection, the performance anomaly detection model being trained using historical cost-per-click data, for the first entity, that corresponds to a particular geographical area. In some embodiments, the performance anomaly detection model can be the performance anomaly detection model 114 of FIG. 1 or the performance anomaly detection model 220 of FIG. 2. At step 1508, based on applying the performance anomaly detection model to the first set of performance metrics, an output can be determined to be above an anomaly threshold.

Figure 16:
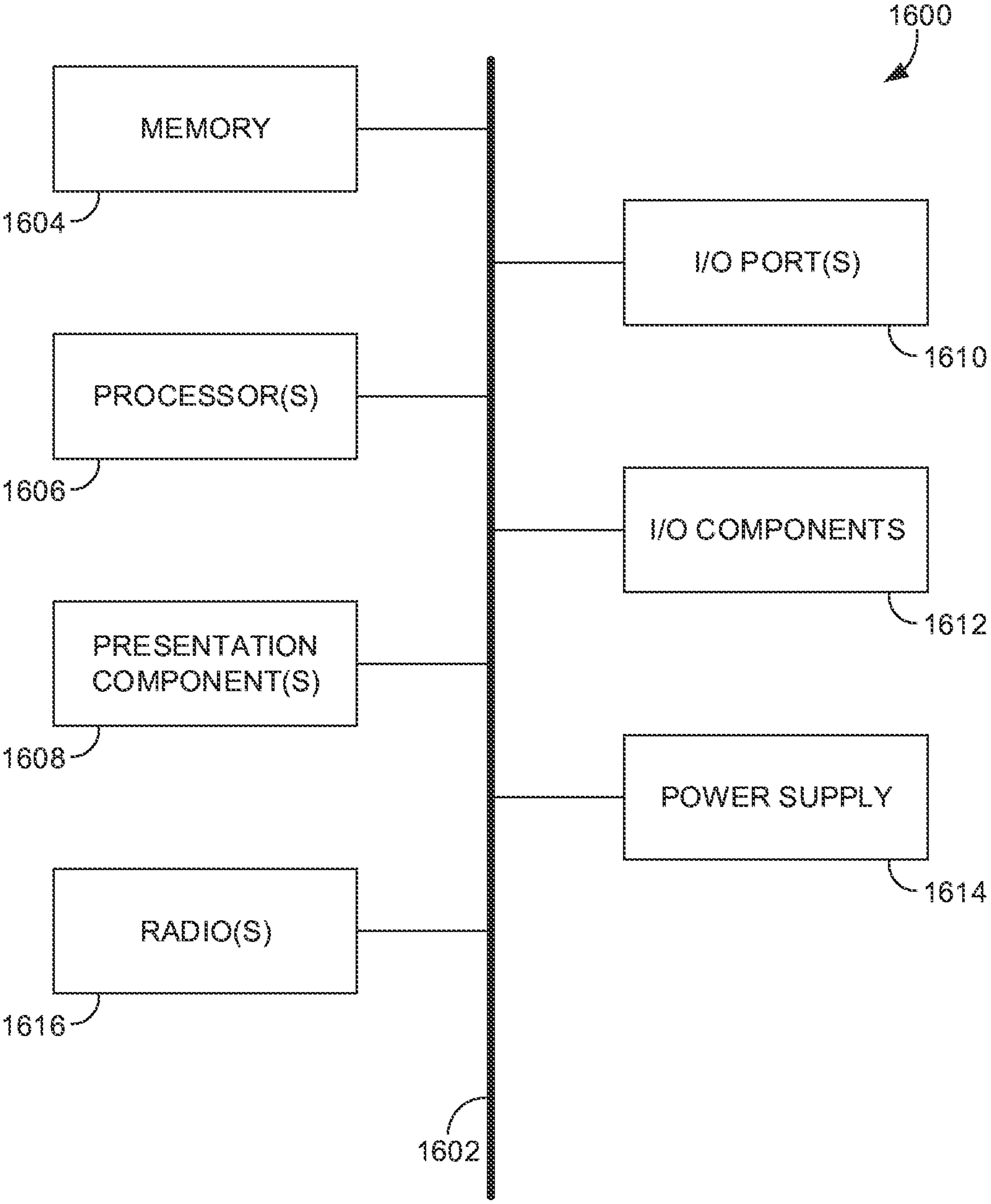
FIG. 16 is an example user device suitable for implementing the described technology, in accordance with an embodiment described herein.

Having described an overview of embodiments of the present technology, an example operating environment in which embodiments of the present technology may be implemented is described below in order to provide a general context for various aspects. Referring initially to FIG. 16, in particular, an example operating environment for implementing embodiments of the present technology is shown and designated generally as computing device 1600. Computing device 1600 is but one example of a suitable computing environment and is not intended to suggest any limitation as to the scope of use or functionality of the technology. Neither should computing device 1600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 16, computing device 1600 includes bus 1602 that directly or indirectly couples the following devices: memory 1604, one or more processors 1606, one or more presentation components 1608, input/output ports 1610, input/output components 1612, and illustrative power supply 1614. Bus 1602 represents what may be one or more busses (such as an address bus, data bus, or combination thereof). Although the various blocks of FIG. 16 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 16 is merely illustrates an example computing device that can be used in connection with one or more embodiments of the present technology. Distinction is not made between such categories as "workstation," "server," "laptop," "hand-held device," etc., as all are contemplated within the scope of FIG. 16 and reference to "computing device."

Computing device 1600 typically includes a variety of computer-readable media. Computer-readable media can be any available media that can be accessed by computing device 1600 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1604 includes computer storage media in the form of volatile or nonvolatile memory. The memory 1604 may be removable, non-removable, or a combination thereof. Example hardware devices include solid-state memory, hard drives, optical-disc drives, etc. Computing device 1600 includes one or more processors that read data from various entities such as memory 1604 or I/O components 1612. Presentation component(s) 1608 present data indications to a user or other device. Examples of presentation components include a display device, speaker, printing component, vibrating component, etc.

I/O ports 1610 allow computing device 1600 to be logically coupled to other devices including I/O components 1612, some of which may be built in. Illustrative components include a microphone, joystick, game pad, satellite dish, scanner, printer, wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the described schematics, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects of the technology that may be practiced from the forgoing disclosure include the following:

Aspect 1: A computer-implemented method comprising: establishing a communication session with a server hosted by a third-party; automatically receiving cost-per-click data for a first entity from the server hosted by the third-party; applying a performance anomaly detection model, trained using historical cost-per-click data, to the cost-per-click data to generate an output; comparing the output provided by the performance anomaly detection model to an anomaly threshold; and based on determining that the output is above the anomaly threshold, broadcasting a notification (e.g., to a user device).

Aspect 2: Aspect 1, wherein the cost-per-click data is automatically received at periodic intervals.

Aspect 3: Aspect 1 or 2, further comprising: receiving historical cost-per-click data for the first entity from the server hosted by the third-party; grouping the historical cost-per-click data based on a predetermined time period; and training the performance anomaly detection model using a first grouping of the historical cost-per-click data, wherein the first grouping is based on a location associated with the historical cost-per-click data.

Aspect 4: Aspect 1, 2, or 3, further comprising: identifying a location of the server; receiving a time stamp for each of the historical cost-per-click data of the first grouping; and tuning the performance anomaly detection model based on the location of the server and the time stamps received.

Aspect 5: Aspect 1, 2, 3, or 4, wherein the performance anomaly detection model includes a time-series model.

Aspect 6: Aspect 1, 2, 3, 4, or 5, wherein the performance anomaly detection model applies a maximum mean discrepancy.

Aspect 7: Aspect 1, 2, 3, 4, 5, or 6, further comprising: establishing a second communication session with a second server hosted by another third-party; automatically receiving cost-per-click data for the first entity from the second server hosted by the other third-party; applying the performance anomaly detection model to the cost-per-click data received from the second server to generate a second output; comparing the second output provided by the performance anomaly detection model to the anomaly threshold; and based on determining that the second output is above the anomaly threshold, providing a second notification.

Aspect 8: Aspect 1, 2, 3, 4, 5, 6, or 7, wherein the anomaly threshold is based on a spending cap associated with the first entity.

Aspect 9: Aspect 1, 2, 3, 4, 5, 6, 7, or 8, further comprising: receiving historical cost-per-click data for the first entity from the server hosted by the third-party; grouping the historical cost-per-click data into at least a first group based on a first predetermined time period and a second group based on a second predetermined time period, the second predetermined time period being a later time period than the first predetermined time period; training the performance anomaly detection model using the first group of historical cost-per-click data and the second group of historical cost-per-click data; and applying the trained performance anomaly detection model to the cost-per-click data to generate the output, the output being generated based on a time period corresponding to the cost-per-click data received for the first entity from the server hosted by the third-party, wherein the output is generated based on the time period corresponding to the cost-per-click data relative to the first predetermined time period and the second predetermined time period.

Aspect 10: a computer system comprising: a processor; and a computer storage medium storing computer-useable instructions that, when used by the processor, causes the computer system to perform operations comprising: establish a communication session with a server hosted by a third-party; automatically receive a plurality of cost-per-click data for a first entity from the server hosted by the third-party; apply a performance anomaly detection model to the plurality of cost-per-click data for anomaly detection, the performance anomaly detection model being trained using historical cost-per-click data; based on applying the performance anomaly detection model, determine that a first cost-per-click data of the plurality of cost-per-click data is above an anomaly threshold; and based on determining that the first cost-per-click data is above the anomaly threshold, broadcasting a notification.

Aspect 11: Aspect 10, wherein the performance anomaly detection model is trained using historical cost-per-click data for the first entity, the historical cost-per-click data and the cost-per-click data corresponding to a particular geographical area.

Aspect 12: Aspect 10, or 11, further comprising: establish a communication session with another server; automatically receive cost-per-click data for the first entity from the other server, wherein the cost-per-click data, from the other server, corresponds to a different particular geographical area; apply the performance anomaly detection model to the cost-per-click data from the other server for anomaly detection, the performance anomaly detection model being trained using historical cost-per-click data, for the first entity, that corresponds to the different particular geographical area; based on applying the performance anomaly detection model to the cost-per-click data from the other server, determine that the cost-per-click data from the other server is above a second anomaly threshold; and based on determining that the cost-per-click data from the other server is above the second anomaly threshold, broadcasting a second notification.

Aspect 13: Aspect 10, 11, or 12, wherein the plurality of cost-per-click data include a plurality of time series of cost-per-click data, and wherein the performance anomaly detection model utilizes a symmetric moving average based on a time and date corresponding to each of the plurality of time series of cost-per-click data to determine that the first cost-per-click data is above the anomaly threshold.

Aspect 14: Aspect 10, 11, 12, or 13, wherein the performance anomaly detection model utilizes an estimation of signal parameters via rotational invariant technique to determine that the first cost-per-click data is above the anomaly threshold.

Aspect 15: one or more computer storage media storing computer-useable instructions that, when used by a computing device, cause the computing device to perform operations, the operations comprising: automatically receiving a plurality of time series that each include cost-per-click data for a first entity from a first server, wherein the cost-per-click data, from the first server, corresponds to a first geographical area; applying a performance anomaly detection model to each of the plurality of time series that each include the cost-per-click data for anomaly detection, the performance anomaly detection model being trained using historical time series that include historical cost-per-click data, for the first entity, that corresponds to the first geographical area; based on applying the performance anomaly detection model to each of the plurality of time series, causing to display on a user device output provided by the performance anomaly detection model; identifying, based on the output provided by the performance anomaly detection mode, cost-per-click data from the plurality of time series that is above an anomaly threshold; and based on identifying the cost-per-click data that is above the anomaly threshold, causing to display on the user device the anomaly detection corresponding to the cost-per-click data that is above the anomaly threshold.

Aspect 16: Aspect 15, wherein the output provided by the performance anomaly detection model and the anomaly detection are displayed on the user device in graphical form.

Aspect 17: Aspect 15 or 16, wherein the output provided by the performance anomaly detection model and the anomaly detection are displayed on the user device in a table.

Aspect 18: Aspect 15, 16, or 17, the operations further comprising receiving, based on causing to display the output provided by the performance anomaly detection model and the anomaly detection on the user device, an indication from the user device that the anomaly detection is a false anomaly detection and updating the performance anomaly detection model based on the false anomaly detection.

Aspect 19: Aspect 15, 16, 17, or 18, the operations further comprising: automatically receiving a second plurality of time series that each include cost-per-click data for the first entity from the first server, wherein the cost-per-click data of the second plurality of time series correspond to the first geographical area; based on updating the performance anomaly detection model, applying the updated performance anomaly detection model to each of the second plurality of time series; based on applying the updated performance anomaly detection model, causing to display on the user device output provided by the updated performance anomaly detection model; identifying cost-per-click data from the second plurality of time series that is above the anomaly threshold; and causing to display on the user device the anomaly detection corresponding to the cost-per-click data from the second plurality of time series that is above the anomaly threshold.

Aspect 20: Aspect 15, 16, 17, 18, or 19, the operations further comprising: automatically receiving a second plurality of time series that each include cost-per-click data for the first entity from a second server, wherein the cost-per-click data of the second plurality of time series correspond to a second geographical area that is different than the first geographical area; applying the performance anomaly detection model to each of the second plurality of time series; causing to display on the user device output, for the second plurality of time series, provided by the updated performance anomaly detection model; identifying cost-per-click data from the second plurality of time series that is above a second anomaly threshold; and causing to display on the user device the anomaly detection corresponding to the cost-per-click data from the second plurality of time series that is above the second anomaly threshold.

What is claimed is:

1. A computer-implemented method comprising:

establishing a communication session between a first server hosted by a first entity and a second server hosted by a third-party entity, wherein the third-party entity hosts one or more servers that provide content of the first entity to user devices of end users;

automatically receiving, at the first server hosted by the first entity, cost-per-click data for the content of the first entity from the second server hosted by the third-party entity, wherein the cost-per-click data from the second server corresponds to provision of the content of the first entity in a first geographical area;

applying a performance anomaly detection model, trained using historical cost-per-click data, to the cost-per-click data to generate an output;

comparing the output provided by the performance anomaly detection model to an anomaly threshold;

based on determining that the output is above the anomaly threshold, automatically causing a remediation action comprising pausing provision of the content for the first entity from one or more servers hosted by the third-party entity to user devices of end users;

automatically receiving second cost-per-click data for the first entity from a third server, wherein the second cost-per-click data from the third server corresponds to a second geographical area that is different than the first geographical area:

applying the performance anomaly detection model to the second cost-per- click data from the third server for anomaly detection;

based on applying the performance anomaly detection model to the second cost-per-click data from the third server, determining that the second cost-per-click data from the third server is above a second anomaly threshold; and based on determining that the second cost-per-click data from the third server is above the second anomaly threshold, automatically causing, a second remediation action comprising pausing provision of content for the first entity from one or more further servers to user devices of end users.

2. The computer-implemented method of claim 1, wherein the cost-per-click data is automatically received at the first server hosted by the first entity at periodic intervals.

3. The computer-implemented method of claim 1, further comprising:

grouping the historical cost-per-click data based on a predetermined time period; and training the performance anomaly detection model using a first grouping of the historical cost-per-click data, wherein the first grouping is based on a location associated with the historical cost-per-click data.

4. The computer-implemented method of claim 3, further comprising:

identifying a location of the second server hosted by the third-party entity;

receiving a time stamp for each of the cost-per-click data; and tuning the performance anomaly detection model based on the location of the second server and the time stamp for each of the cost-per-click data received.

5. The computer-implemented method of claim 1, wherein the performance anomaly detection model includes a time-series model.

6. The computer-implemented method of claim 5, wherein the performance anomaly detection model applies a maximum mean discrepancy.

7. The computer-implemented method of claim 1, wherein the anomaly threshold is based on a spending cap associated with the first entity.

8. The computer-implemented method of claim 1, further comprising:

accessing the historical cost-per-click data for the first entity;

grouping the historical cost-per-click data into at least a first group based on a first predetermined time period and a second group based on a second predetermined time period, the second predetermined time period being a later time period than the first predetermined time period;

training the performance anomaly detection model using the first group of historical cost-per-click data and the second group of historical cost-per-click data; and wherein the output from the performance anomaly detection model is generated based on a time period corresponding to the cost-per-click data received for the first entity from the second server hosted by the third-party entity relative to the first predetermined time period and the second predetermined time period.

9. A computer system comprising:

a processor; and a computer storage medium storing computer-useable instructions that, when used by the processor, causes the computer system to perform operations comprising:

establishing a communication session between a first server hosted by a first entity and a second server hosted by a third-party entity, wherein the third-party entity hosts one or more servers that provide content of the first entity to user devices of end users;

automatically receiving, at the first server hosted by the first entity, a plurality of cost-per-click data for the content of the first entity from the second server hosted by the third-party entity;

applying a performance anomaly detection model to the plurality of cost- per-click data for anomaly detection, the performance anomaly detection model being trained using historical cost-per-click data, wherein the historical cost-per-click data and the plurality of cost-per-click data correspond to a first geographical area;

based on applying the performance anomaly detection model, determining that a first cost-per-click data of the plurality of cost-per-click data is above an anomaly threshold; and based on determining that the first cost-per-click data is above the anomaly threshold, automatically causing a remediation action comprising pausing provision of the content for the first entity from one or more servers hosted by the third-party entity to user devices of end users;

establishing a second communication session with a third server hosted by a second third-party entity;

automatically receiving second cost-per-click data for the first entity from the third server, wherein the second cost-per-click data from the third server corresponds to a second geographical area different than the first geographical area of the plurality of cost-per-click data from the second server;

applying the performance anomaly detection model to the second cost-per-click data from the third server for anomaly detection, the performance anomaly detection model being trained using historical cost-per-click data for the first entity that corresponds to the second geographical area;

based on applying the performance anomaly detection model to the second cost-per-click data from the third server, determining that the second cost-per-click data from the third server is above a second anomaly threshold; and based on determining that the second cost-per-click data from the third server is above the second anomaly threshold, automatically causing a second remediation action comprising pausing provision of content for the first entity from one or more further servers hosted by the second third-party entity to user devices of end users.

10. The computer system of claim 9, wherein the plurality of cost-per-click data include a plurality of time series of cost-per-click data, and wherein the performance anomaly detection model utilizes a symmetric moving average based on a time and date corresponding to each of the plurality of time series of cost-per-click data to determine that the first cost-per-click data is above the anomaly threshold.

11. The computer system of claim 10, wherein the performance anomaly detection model utilizes an estimation of signal parameters via rotational invariant technique to determine that the first cost-per-click data is above the anomaly threshold.

12. One or more non-transitory computer storage media storing computer-useable instructions that, when executed by at least one processor, cause the at least one processor to perform operations, the operations comprising:

automatically receiving, at a first server hosted by a first entity, a plurality of time series that each include cost-per-click data for content of a first entity from a second server hosted by a third-party entity, wherein the third-party entity hosts one or more servers that provide the content of the first entity to user devices of end users, and wherein the cost-per-click data from the second server corresponds to provision of the content of the first entity in a first geographical area;

applying a performance anomaly detection model to each of the plurality of time series that each include the cost-per-click data for anomaly detection, the performance anomaly detection model being trained using historical time series that include historical cost-per-click data for the first entity that corresponds to the first geographical area;

based on applying the performance anomaly detection model to each of the plurality of time series, causing to display, on a user device of the first entity, output provided by the performance anomaly detection model;

identifying, based on the output provided by the performance anomaly detection model, cost-per-click data from the plurality of time series that is above an anomaly threshold;

based on identifying the cost-per-click data that is above the anomaly threshold, automatically causing a remediation action comprising pausing provision of the content for the first entity from one or more servers hosted by the third-party entity to user devices of end users;

automatically receiving a second plurality of time series that each include cost-per-click data for the first entity from a third server, wherein the cost-per-click data of the second plurality of time series correspond to a second geographical area that is different than the first geographical area;

applying the performance anomaly detection model to each of the second plurality of time series;

causing to display, on the user device, output for the second plurality of time series provided by the performance anomaly detection model;

identifying cost-per-click data from the second plurality of time series that is above a second anomaly threshold; and causing to display, on the user device of the first entity, the anomaly detection corresponding to the cost-per-click data from the second plurality of time series that is above the second anomaly threshold.

13. The one or more non-transitory computer storage media of claim 12, wherein the output provided by the performance anomaly detection model and an indication of anomaly detection are displayed on the user device of the first entity in graphical form.

14. The one or more non-transitory computer storage media of claim 12, wherein the output provided by the performance anomaly detection model and an indication of anomaly detection are displayed on the user device in a table.

15. The one or more non-transitory computer storage media of claim 12, the operations further comprising receiving, based on causing to display the output provided by the performance anomaly detection model and an indication of anomaly detection on the user device, an indication from the user device of the first entity that the anomaly detection is a false anomaly detection and updating the performance anomaly detection model based on the false anomaly detection.

16. The one or more non-transitory computer storage media of claim 15, the operations further comprising:

automatically receiving a third plurality of time series that each include cost-per-click data for the first entity from the second server, wherein the cost-per-click data of the a third plurality of time series correspond to the first geographical area;

based on updating the performance anomaly detection model, applying the updated performance anomaly detection model to each of the a third plurality of time series;

based on applying the updated performance anomaly detection model, causing to display on the user device output provided by the updated performance anomaly detection model;

identifying cost-per-click data from the a third plurality of time series that is above the anomaly threshold; and causing to display on the user device of the first entity the anomaly detection corresponding to the cost-per-click data from the a third plurality of time series that is above the anomaly threshold.

* * * * *